US008305383B2

(12) United States Patent
Takeda et al.

(10) Patent No.: US 8,305,383 B2
(45) Date of Patent: Nov. 6, 2012

(54) DATA ACCESS APPARATUS AND METHOD

(75) Inventors: Naoki Takeda, Tokyo (JP); Tetsujiro Kondo, Tokyo (JP); Kenji Takahashi, Kanagawa (JP); Hiroshi Sato, Tokyo (JP); Tsutomu Ichikawa, Kanagawa (JP); Hiroki Tetsukawa, Kanagawa (JP); Masaki Handa, Kanagawa (JP)

(73) Assignee: Sony Corporation (JP)

( * ) Notice: Subject to any disclaimer, the term of this patent is extended or adjusted under 35 U.S.C. 154(b) by 1077 days.

(21) Appl. No.: 11/435,611

(22) Filed: May 17, 2006

(65) Prior Publication Data
US 2006/0290983 A1  Dec. 28, 2006

(30) Foreign Application Priority Data
May 18, 2005 (JP) ................. P2005-145802

(51) Int. Cl.
*G06T 1/60* (2006.01)
(52) U.S. Cl. ....................... 345/530; 345/572
(58) Field of Classification Search .................. 345/571, 345/530, 572
See application file for complete search history.

(56) References Cited

U.S. PATENT DOCUMENTS

| 5,731,838 A * | 3/1998 | Gunji et al. ............. 348/699 |
| 5,828,423 A * | 10/1998 | Serizawa et al. ........ 348/699 |
| 6,005,592 A * | 12/1999 | Koizumi et al. ......... 345/571 |
| 6,301,649 B1 * | 10/2001 | Takasugi .................. 711/217 |
| 6,715,024 B1 * | 3/2004 | Lin ........................... 711/5 |
| 2002/0065665 A1 * | 5/2002 | Hamasaki et al. ....... 704/500 |
| 2003/0007099 A1 * | 1/2003 | Zhang et al. ............. 348/607 |
| 2004/0150734 A1 * | 8/2004 | Sobel et al. .............. 348/272 |
| 2004/0181503 A1 * | 9/2004 | Moseler et al. .......... 707/1 |

FOREIGN PATENT DOCUMENTS

| JP | 59143473 A | 8/1984 |
| JP | 02032478 A | 2/1990 |
| JP | 06348826 A | 12/1994 |
| JP | 2000090256 A | 3/2000 |
| JP | 2001-061152 A | 3/2001 |
| JP | 2003-203236 A | 7/2003 |

* cited by examiner

*Primary Examiner* — Maurice L McDowell, Jr.
(74) *Attorney, Agent, or Firm* — Lerner, David, Littenberg, Krumholz & Mentlik, LLP

(57) ABSTRACT

A data access apparatus has a memory portion including plural memory banks. A data storage control portion stores the pixel data in the plural memory banks with the pixel data being divided into the plural memory banks based on information on an access pattern of plural pixels set on a predetermined screen. A data access control portion reads pixel data relative to the plural pixels specified by the access pattern at the same time from the plural memory banks at each set position in which the set position of the access pattern moves from the start position thereof toward a pixel row direction. A selector portion transmits pixel data corresponding to respective pixels constituting each of the groups of pixels based on correspondence information on input and output. Each group of pixels includes a center pixel and peripheral pixels positioned at a periphery of the center pixel.

11 Claims, 26 Drawing Sheets

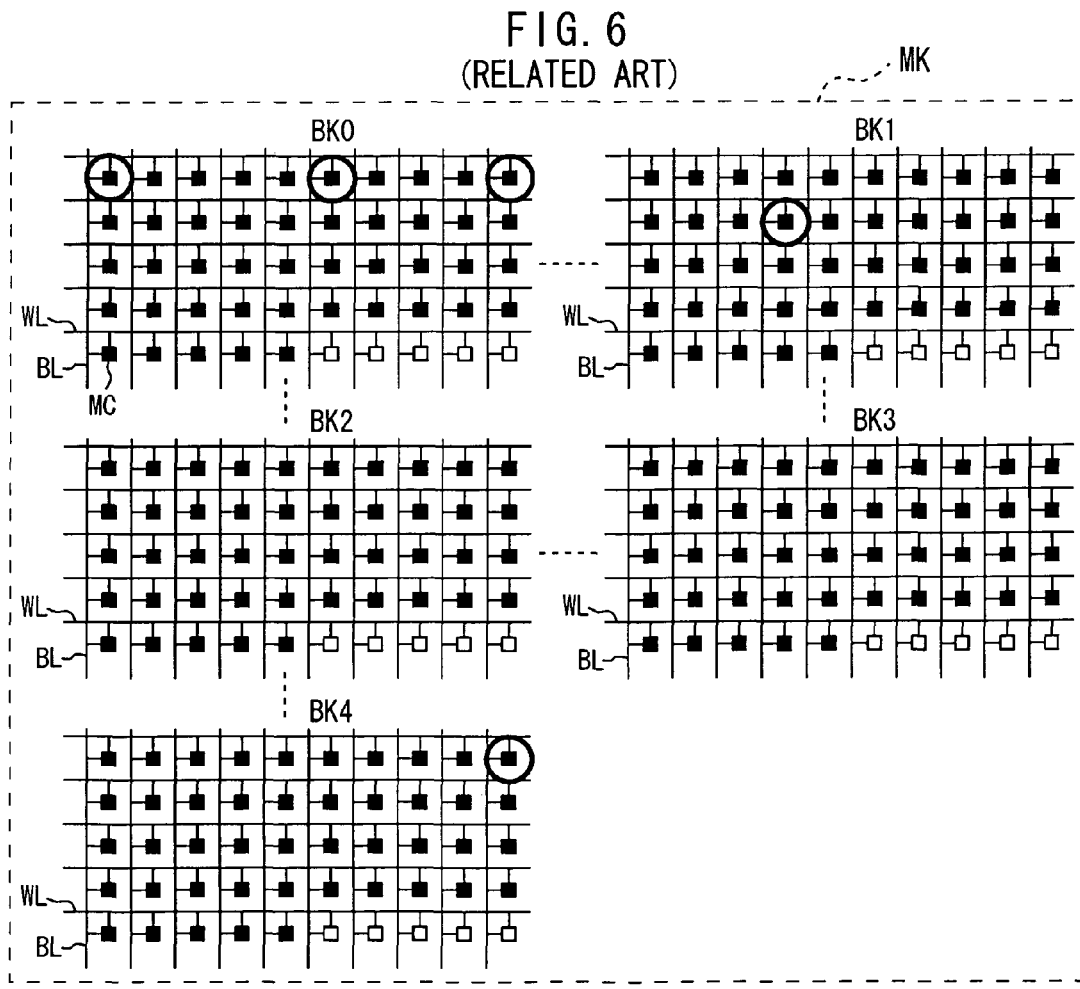

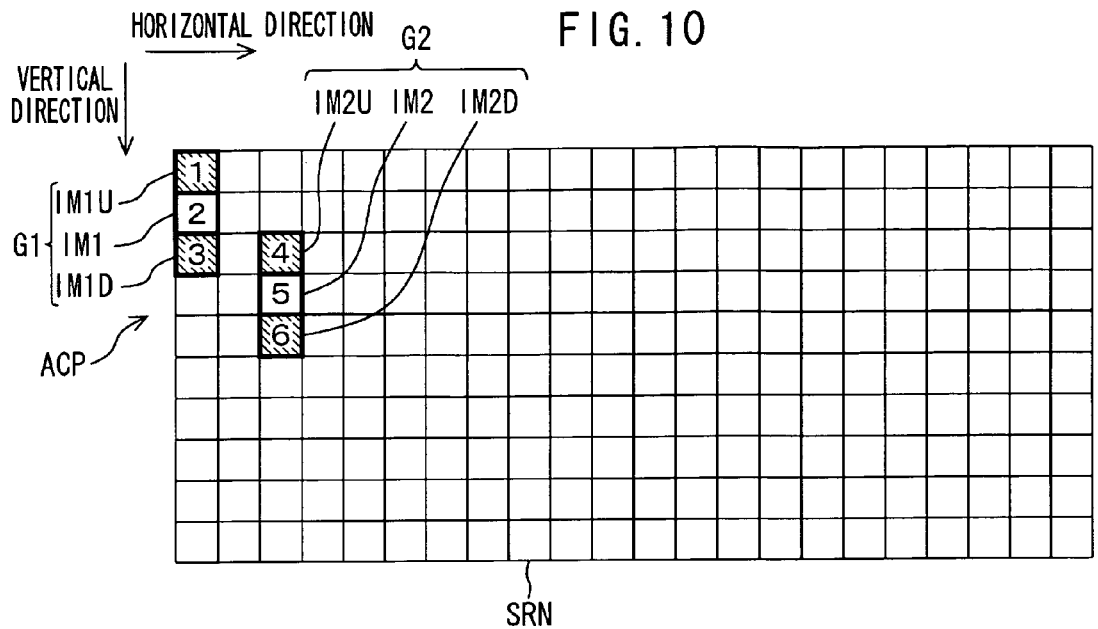
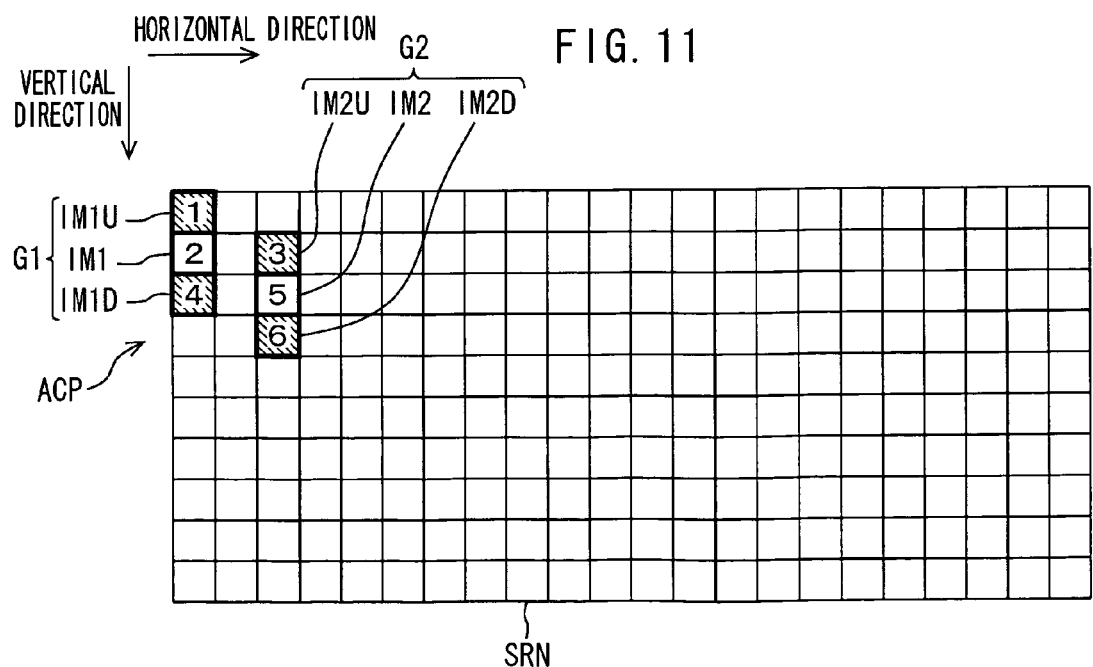

DATA ACCESS APPARATUS AND METHOD

CROSS-REFERENCE TO RELATED APPLICATIONS

The present application claims priority from Japanese Patent Application No. 2005-145802 filed on May 18, 2005, the disclosure of which is hereby incorporated by reference herein.

BACKGROUND OF THE INVENTION

The present invention relates to a data access apparatus, a data access method, a program product therefor and a recording medium therefor that are used for image processing such as pattern recognition and motion detection and set as an access pattern a pattern of plural pixels on a desired screen to acquire items of pixel data on the plural pixels specified by the access pattern in each set position in which a set position of the access pattern sequentially moves from a start position thereof toward a pixel row direction thereof.

A semiconductor memory MY has had such a configuration that a memory cell MC can be accessed by specifying a word line WL and a bit line BL, as shown in FIG. 1, and data stored in the memory cell MC intersected by the word line WL and the bit line BL, which have been specified, has been read out thereof. Thus, in the semiconductor memory MY having such the configuration, plural word lines WL share the same bit line BL. If two word lines WL1, WL2, for example, are specified as shown in FIG. 2, items of the data on the word lines WL1, WL2 intermingle in the bit line BL, thereby disabling the items of data on the separate word lines WL to be accessed at the same time.

On the other hand, as shown in FIG. 3, the semiconductor memory MY is divided into plural memory banks BK0 to BKn−1, to which any separate addresses are specified, and thence, the items of data on the word lines WL can be accessed at the same time. This, however, disables the items of data on the different word lines WL in the memory bank to be accessed at the same time.

It is generally any one of the cases where different memory banks store plural items of data and these plural items of the data are stored in the memory cells on the same word line that the items of data can be accessed at the same time.

Various kinds of processing such as pattern recognition and motion detection have been carried out by acknowledging a specified data array included in the input data. For example, an image data processing apparatus contains a buffer memory that stores pixel data of some lines and transmits data for each pixel, a data processing unit including plural processor elements each for enabling data having a data width of some bits to be processed and processing the data in parallel at the same time by the plural processor elements, a control information memory for storing matching reference data and control data. Each processor element in the data processing unit digitizes, using a threshold value, a group of pixel data of matrix in which a target pixel designated to itself is set as a center thereof, among items of image data read out of the buffer memory to convert them into serial subject data that is segmented into data having a bit width which the processor element can process. The image data processing apparatus determines whether the subject data corresponds to reference data stored in a control information memory, which has same form as that of the subject data (see Japanese Patent Application Publication No. 2003-203236).

Further, in a motion image processing field, any motion, namely, a motion direction and an amount (velocity) of moving of the object in the images that are different from each other in time have been used. For example, the motion has been used relative to inter-frame motion compensation coding relative to any high efficiency image coding and a parameter control by motion in a television noise reduction device by an inter-frame time region filter. As a motion detection method for obtaining the motion, a block-matching method has been known. The motion detection method for detecting any motion in an image signal has been known (see Japanese Patent Application Publication No. 2001-61152). The method includes the steps of: generating a table for integration values using a matching method for one entire screen or for each relatively large block obtained by dividing one screen into several blocks and extracting one or plural candidate vector(s) using the table for each relatively large block obtained by dividing one screen into several blocks; and matching only the candidate vector(s) to detect a motion vector for each pixel or relatively small block. In such the motion detection method having two steps, it may be necessary to read plural items of optional pixel data in a screen at the same time during both of the two steps, representative point matching and vector assignment, by which any motion detection in the screen can be carried out by the representative point matching of two step system.

A pattern of plural pixels can be set as an access pattern on a predetermined screen in which pixel rows each extending in a vertical or horizontal direction are sequentially arranged in the vertical or horizontal direction and then, items of pixel data on plural pixels specified by the access pattern can be obtained at the same time on each set position in which the set position of the access pattern sequentially moves from a start position thereof toward a pixel row direction pixel-by-pixel.

For example, as shown in FIG. 4, a pattern of five pixels, IM1 to IM5, can be set as an access pattern ACP on a screen SRN in which pixel rows each extending in a horizontal direction are sequentially arranged in a vertical direction and then, a set position of the access pattern ACP can sequentially move from a start position thereof toward a pixel row direction. In this case, the pixel row direction is a horizontal direction. The set position of the access pattern ACP moves based on a raster scan sequence. A symbol, "☐" shown in FIG. 4 indicates one pixel and the set position of the access pattern ACP shown in FIG. 4 indicates a start position thereof.

It is estimated that five memory banks BK0 to BK4 sequentially store pixel data of each pixel row in the screen SRN pixel-by-pixel as shown in FIG. 5 starting from a left-upper periphery pixel according to the raster scan sequence. It is to be noted that figures described in the symbol, "☐" shown in FIG. 5 indicate any bank addresses BK0 to BK4. In this case, when the set position of the access pattern ACP stays in its start position, items of pixel data relative to five pixels IM1 to IM5 that the access pattern ACP specifies are stored in address positions encircled in the memory banks BK0 to BK4 as shown in FIG. 6, thereby enabling the five items of pixel data to be accessed and read out at the same time.

When the set position of the access pattern ACP moves from its start position pixel-by-pixel up to a set position moved by four pixels, the five items of pixel data can be accessed and read out at the same time, as a case where the set position of the access pattern ACP stays in its start position. As shown in FIG. 7, however, when the set position of the access pattern ACP moves to a set position moved by five pixels, items of pixel data relative to five pixels IM1 to IM5 that the access pattern ACP specifies are stored in address positions encircled in the memory banks BK0 to BK4 as shown in FIG. 8, and thence, it may be necessary to access items of data by plural word lines in the memory bank BK0, thereby disabling the five items of pixel data to be accessed and read out at the same time.

Although items of pixel data can be accessed at the same time according to any access pattern if storage position is suitably selected, it may be necessary to split a memory bank finely so that one memory bank can be configured of only one word line, in order to allow plural items of pixel data to be accessed at the same time according to any access patterns. However, the finer the memory bank is split, the larger the number of bank increases. An address is separately assigned to each bank, thereby resulting in enormous numbers of address buses. Decoders and/or selectors corresponding to numbers of banks can be necessitated, thereby increasing a chip area therefor. Plural banks operate at the same time, thereby increasing power consumption therefor.

Alternatively, it has been proposed to access plural items of pixel data corresponding to an access pattern in a time-sharing mode and store them in a cache memory or a buffer memory temporarily, thereby implementing any concurrent access thereof virtually (see Japanese Utility Model Application Publications Nos. S63-35146 and H08-896), which generates any delay in terms of time.

It is desirable to provide a data access apparatus, a data access method, a program product therefor and a recording medium therefor, which are easily capable of acquiring items of pixel data relative to the plural pixels specified by the access pattern at the same time at each set position in which a set position of the access pattern sequentially moves from a start position thereof toward a pixel row direction thereof.

SUMMARY OF THE INVENTION

According to an embodiment of the present invention, there is provided a data access apparatus. The data access apparatus has a memory portion including plural memory banks. The data access apparatus also has a data storage control portion that controls the memory portion to set as a target pixel a pixel in a pixel row in a predetermined screen sequentially in which pixel rows each extending in a vertical or horizontal direction are sequentially arranged in the vertical or horizontal direction, and to store pixel data of the target pixel in the plural memory banks, the pixel data of the target pixel being divided into the plural memory banks based on information on an access pattern of plural pixels set on the predetermined screen. The plural pixels are plural center pixels and peripheral pixels positioned at the periphery of each of the center pixels. The data access apparatus further has a data access control portion that controls the memory portion to acquire items of pixel data for the plural pixels specified by the access pattern at the same time from the plural memory banks at each set position in which the set position of the access pattern moves from a start position thereof toward a pixel row direction. The data access apparatus additionally has a selector portion that receives items of pixel data for the plural pixels specified by the access pattern, the items of pixel data being acquired from the plural memory banks at the same time, and transmits items of the pixel data corresponding to respective pixels constituting groups of pixels based on correspondence information on input and output. Each group of pixels includes a center pixel and peripheral pixels positioned at a periphery of the center pixel. The data storage control portion starts storing the pixel data of the target pixel in a first memory bank when the target pixel first corresponds to any one of the plural pixels based on the plural pixels specified by the access pattern at a start position of the set position, and then switches the memory banks that store the pixel data of the target pixel sequentially when the target pixel corresponds to any one of the plural pixels. When the set position is a predetermined position, the data access control portion reads items of the pixel data for the plural pixels specified by the access pattern at the predetermined position from the plural memory banks at the same time. When the set position moves toward the pixel row direction, the data access control portion stores each item of the pixel data read from the memory banks in a memory bank that is just before the memory bank that stores the pixel data to store respective items of the pixel data for the plural pixels specified by the access pattern at each of the set positions in the corresponding separate memory banks.

In embodiments of this invention, pixels of a pixel row in a predetermined screen in which pixel rows each extending in a vertical or horizontal direction are sequentially arranged in the vertical or horizontal direction is set as a target pixel sequentially. Items of the pixel data relative to the target pixels are stored in the plural memory banks with the data being divided into the memory banks.

For example, the data storage control portion includes a correspondence determination portion that determines whether the target pixel is a pixel corresponding to any one of the plural pixels (early access pixels) specified by the access pattern set at the start position of the set position; and an address-generating portion that generates a write address to the memory portion for each target pixel based on the determination output from the correspondence determination portion.

In this case, when the target pixel first corresponds to any one of the plural pixels specified by the access pattern, it starts storing pixel data of the target pixel in a first memory bank. Then, when the target pixel corresponds to any one of the plural pixels, the memory banks that store pixel data of the target pixel are sequentially switched. Thus, the items of pixel data for the early access pixels that are specified by the access pattern set at the start position can be stored in the corresponding separate memory banks, thereby enabling the items of pixel data to be accessed at the same time.

In the embodiments of this invention, items of pixel data for the plural pixels (access pixels) specified by the access pattern are acquired at the same time from the plural memory banks at each set position in which the set position of the access pattern moves from the start position thereof toward a pixel row direction.

For example, the data access control portion includes a read-address-generating portion that generates read addresses for the plural memory banks and a write-address-generating portion that generates write addresses for the plural memory banks.

For each of the memory banks, the read-address-generating portion sets a first read address as a read-starting address obtained from outside and increments the read address to generate a next read address when reading the pixel data at each set position. For each of the memory banks, the write-address-generating portion sets a first write address as a write-starting address obtained from outside and increments the write address to generate a next write address when writing the pixel data at each set position.

For example, the data access control portion further includes a read-flag-generating portion that generates a read flag indicating whether a read operation from the respective plural memory banks is available or not. For each of the memory banks, the read-flag-generating portion sets the read flag for the memory bank in which the pixel data for any one of the plural pixels specified by the access pattern set at the start position of the set position is stored to a flag-on state indicating that read-out is available, based on any read flag obtained from outside, and sets the read flag for other memory banks to a flag-off state indicating that read-out is unavailable.

In this case, when the set position of the access pattern is a predetermined position, items of pixel data for the plural pixels (access pixels) specified by the access pattern at the predetermined position are read from the plural memory banks at the same time, and when the set position moves toward the pixel row direction, items of pixel data for the plural pixels specified by the access pattern at the set position are read from the predetermined memory banks and the read pixel data is stored in a memory bank that is just before the memory bank that stores the pixel data to store respective items of the pixel data for the plural pixels specified by the access pattern set at the set position in the corresponding separate memory banks. Thus, at all the positions where the set position of the access pattern moves from its start position, items of pixel data for the plural access pixels specified by the access pattern are respectively stored in the corresponding separate memory banks, thereby enabling the items of pixel data to be accessed.

For example, the read flag to be given to the data access control portion is obtained from the data storage control portion.

In this case, the data storage control portion further includes a read-flag-generating portion that generates a read flag indicating whether a read operation corresponding to respective plural memory banks is performed. The read-flag-generating portion sets the read flag for the memory bank in which the pixel data corresponding to any one of the plural pixels is stored to a flag-on state indicating that read-out is available, and the read flag for other memory banks to a flag-off state indicating that read-out is unavailable.

Thus, giving the data access control portion the read flag from the data storage control portion avoids any control apparatus for controlling, for example, the data storage control portion and the data access control portion generating the read flag based on the information on the access pattern and sending it to the data access control portion.

For example, the write-starting address and the read-starting address to be given to the data access control portion are obtained from the data storage control portion.

In this case, the data storage control portion further includes a start-address-generating portion that generates a read-starting address and a write-starting address which correspond to respective plural memory banks. For each of the memory banks, the start-address-generating portion sets an address in which first pixel data is stored as the read-starting address and an address next to an address in which last pixel data is stored as the write-starting address.

Thus, giving the data access control portion the write-starting address and the read-starting address from the data storage control portion avoids any control apparatus for controlling, for example, the data storage control portion and the data access control portion generating the write-starting address and the read-starting address based on the information on the access pattern and sending it to the data access control portion.

In the embodiments of the invention, the access pattern is a pattern of plural pixels set on a predetermined screen, which include plural center pixels and peripheral pixels positioned at a periphery of each of the center pixels. A center pixel and peripheral pixels positioned at the periphery of the center pixel are referred to as a group of pixels. In this case, according to the positional relationship between the plural center pixels, an order that the respective pixels constituting the plural groups of pixels corresponding to the plural center pixels are set as the target pixel is not successive in each of the groups of pixels. Further, in this case, according to the positional relationship between the plural center pixels, pixels constituting the plural groups of pixels can be overlapped so that the number of pixels constituting the access pattern can decrease below that of pixels obtained by multiplying the number of pixels constituting one group of pixels by the number of groups of pixels.

As described above, items of pixel data for the plural pixels specified by the access pattern are read from the plural memory banks at the same time. In this case, the plural pixels are arranged according to an order in which they are set as the target pixel at a first storage stage thereof. In the embodiments of the invention, items of pixel data are selectively transmitted based on correspondence information on input and output with them corresponding to respective pixels constituting each of the groups of pixels from items of pixel data for the plural pixels that are acquired from the plural memory banks at the same time. This allows pixel data that is successive in each of the groups of pixels to be obtained.

For example, a selector-portion-setting portion generates the information on the access pattern and the correspondence information on input and output. This selector-portion-setting portion includes an access pattern extension portion that acquires coordinate information for respective pixels constituting each of the groups of pixels based on coordinate information on the plural center pixels and information on the peripheral pixels positioned at the periphery of each of the center pixels. The selector-portion-setting portion also includes a sort portion that acquires order information indicating an order in which respective pixels constituting each of the groups of pixels are set as the target pixel based on the acquired coordinate information and generates the information on the access pattern representing the acquired coordinate information as the order information. The selector-portion-setting portion further includes a selector-position-setting portion that generates the correspondence information on input and output based on the acquired order information on the respective pixels constituting each of the groups of pixels.

Such selector-portion-setting portion enables an optional access pattern to be set by receiving any coordinate information on the plural center pixels and any information on the peripheral pixels positioned at the periphery of each of the center pixels.

The concluding portion of this specification particularly points out and directly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is a diagram for illustrating an example of a screen, in which items of pixel data are stored in four memory banks;

FIG. 6 is a schematic diagram for illustrating an example of the semiconductor memory in which items of pixel data are stored in data access positions in each of the memory banks when the access pattern stays in its start position;

FIG. 10 is a diagram for illustrating an example of a screen on which an access pattern is set;

FIG. 11 is a diagram for illustrating an example of a screen on which an access pattern is set;

FIG. 17 is a diagram for illustrating an example of a screen in which items of pixel data are stored in six memory banks when starting the storage of pixel data relative to the access pattern shown in FIG. 11;

FIG. 18 is a schematic diagram for illustrating an example of the memory portion in which items of pixel data are stored in the memory banks after the start of data storage relative to the access pattern shown in FIG. 11;

DETAILED DESCRIPTION

The following will describe embodiments of the invention with reference to the accompanying drawings.

Figure 1:
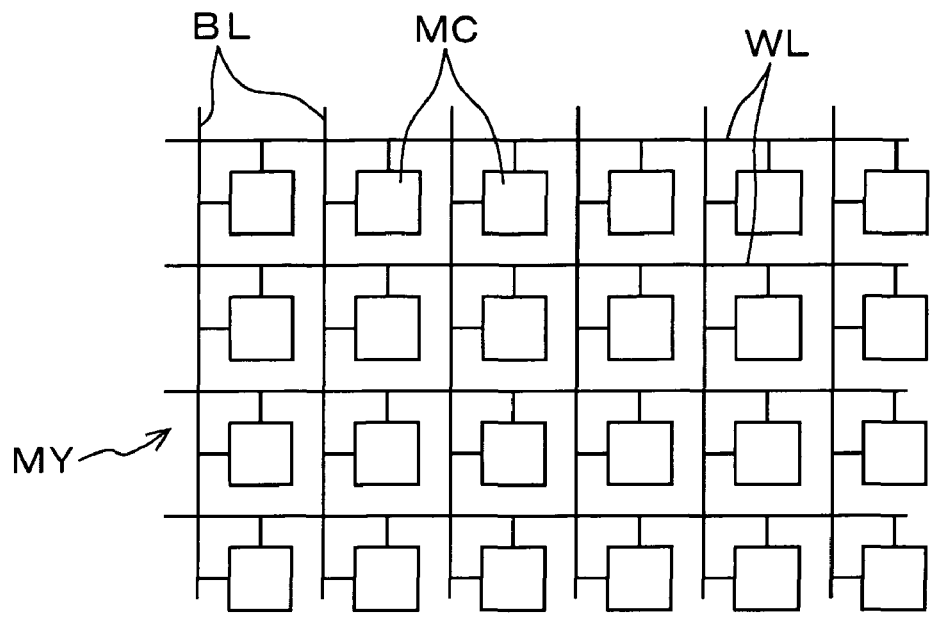
FIG. 1 is a schematic diagram for illustrating a configuration of a semiconductor memory in general.
Figure 2:
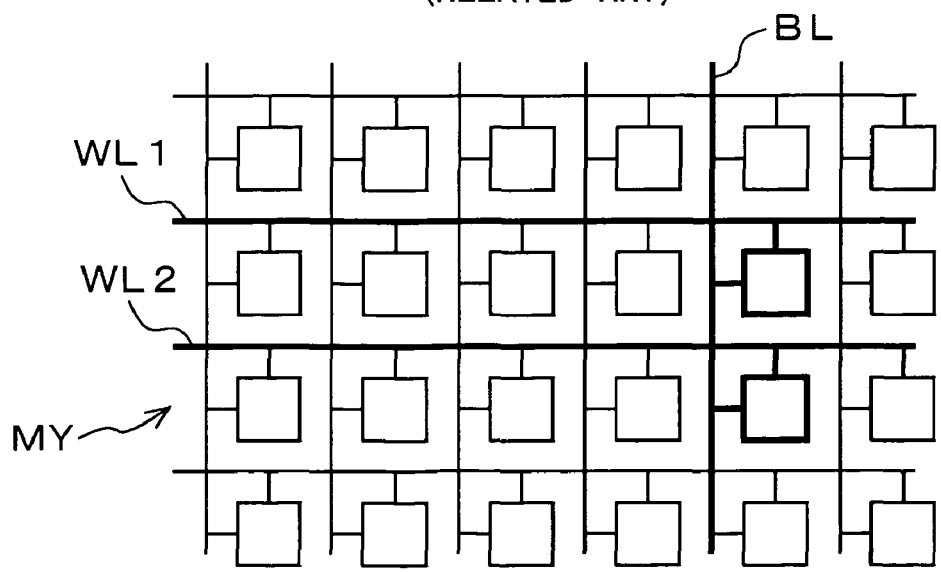
FIG. 2 is a schematic diagram for illustrating a configuration of the semiconductor memory in general in which the items of data on the different word lines are not accessed at the same time.
Figure 3:
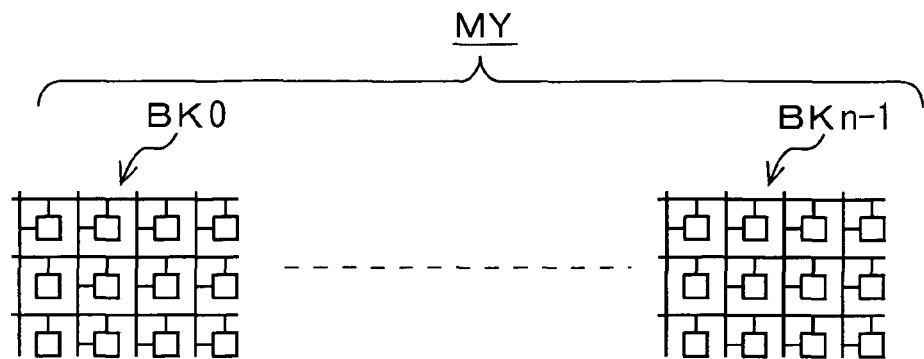
FIG. 3 is a schematic diagram for illustrating a configuration of a semiconductor memory including plural bank memories.
Figure 4:
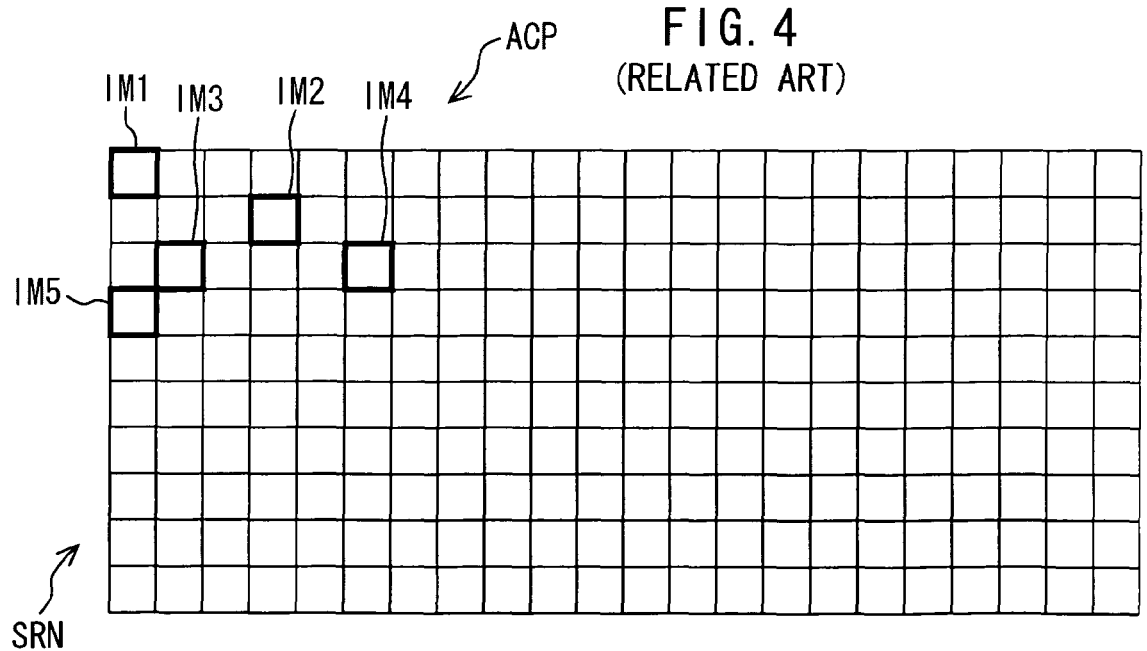
FIG. 4 is a diagram for illustrating an example of a screen on which an access pattern is set.
Figures 7, 8:
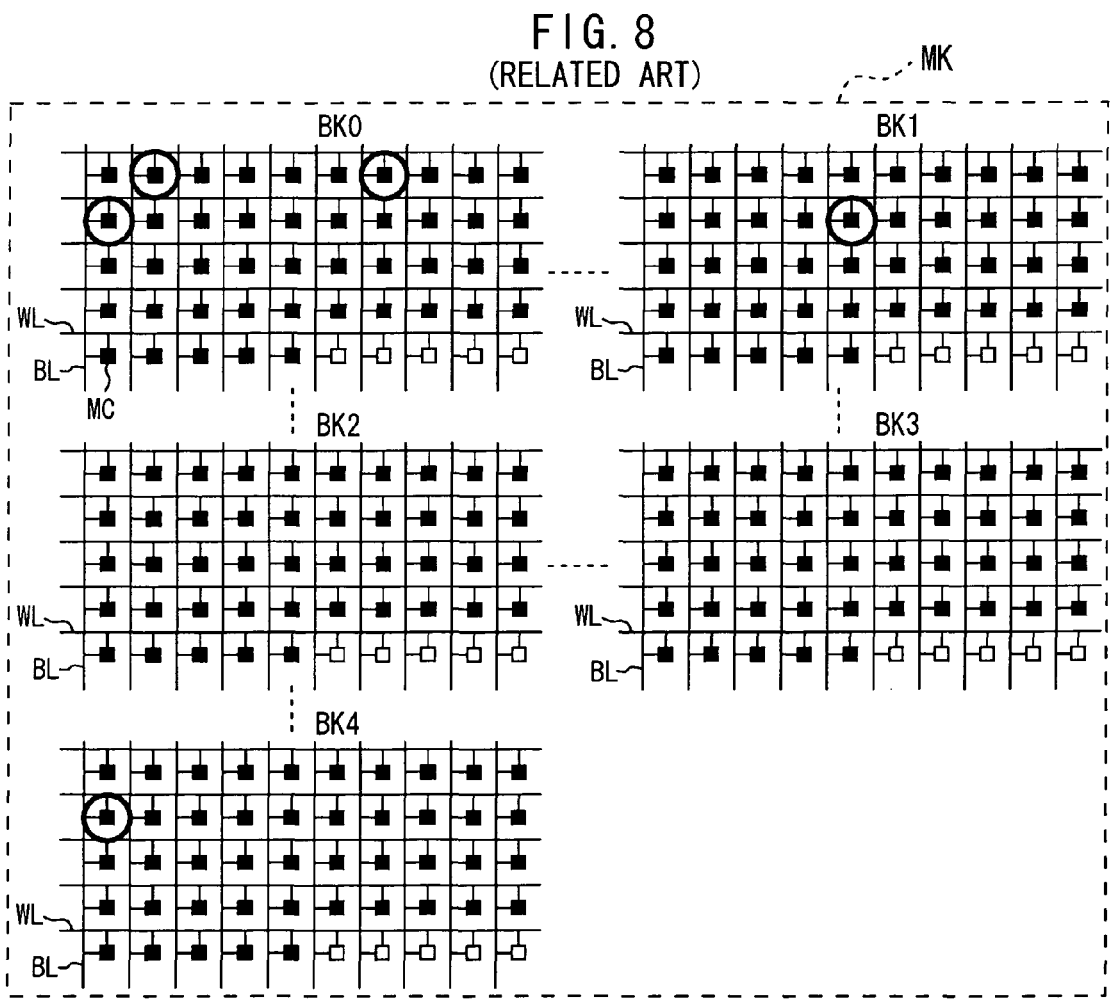
FIG. 7 is a diagram for illustrating an example of a screen, items of pixel data in which are stored in four memory banks when the access pattern moves by five pixels.
FIG. 8 is a schematic diagram for illustrating an example of the semiconductor memory in which items of pixel data are stored in data access positions in each of the memory banks when the access pattern moves by five pixels.
Figure 9:
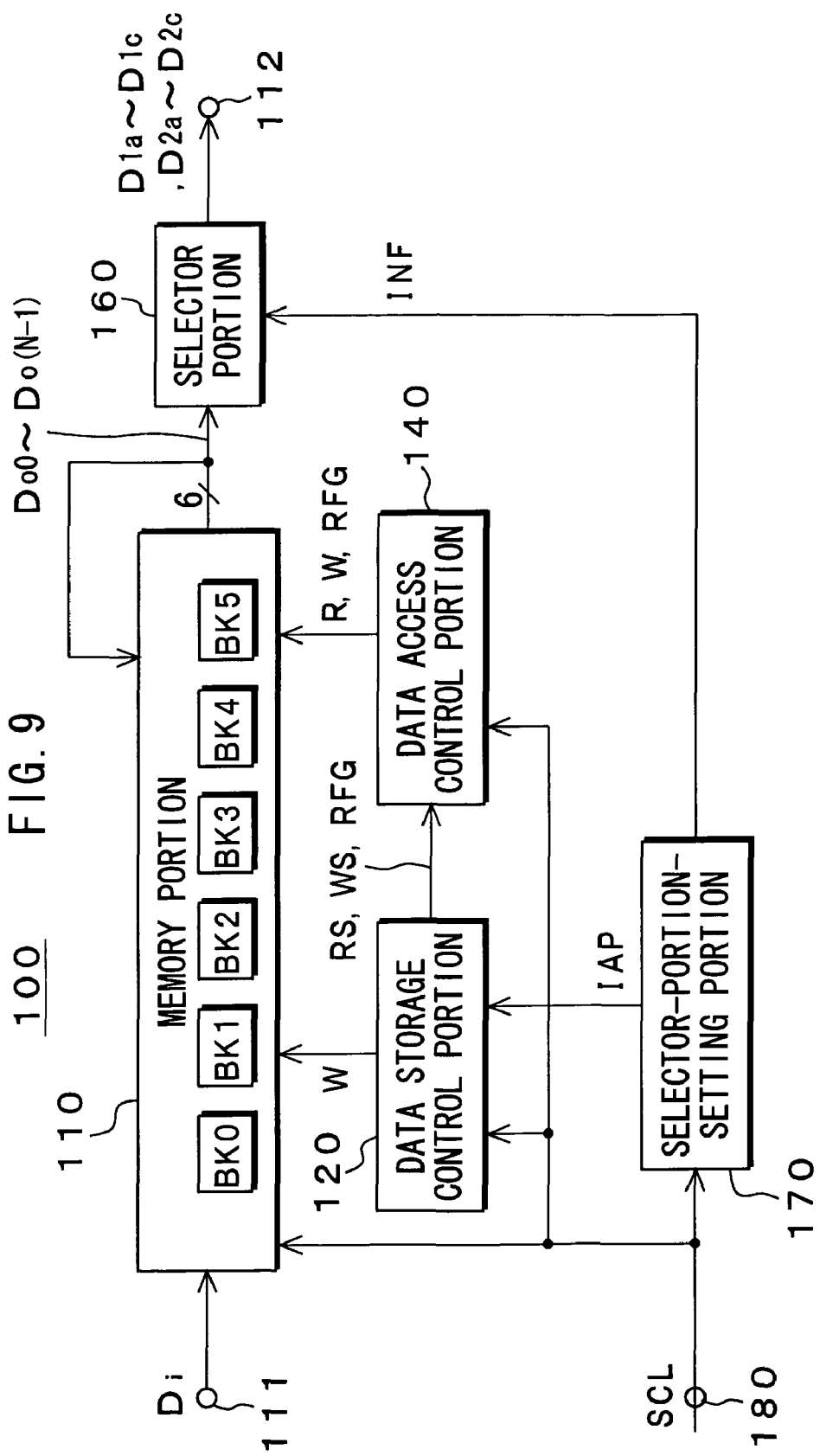
FIG. 9 is a block diagram for showing a configuration of an embodiment of a data access apparatus according to the invention.

FIG. 9 shows a configuration of an embodiment of a data access apparatus 100 according to the invention.

The data access apparatus 100 has a memory portion 110, a data storage control portion 120, a data access control portion 140, a selector portion 160, and a selector-portion-setting portion 170.

The memory portion 110 operates based on a control signal SCL received through a receiving terminal 180 from a control device, not shown. The memory portion 110 receives pixel data Di of a predetermined screen to be stored through another receiving terminal 111 at an early storage stage. The predetermined screen has such a configuration that pixel rows each extending in a horizontal direction are sequentially arranged in a vertical direction. The memory portion 110 receives items of pixel data relative to each pixel row as target pixels, according a raster scan order. The memory portion 110 includes plural memory banks. In this embodiment, the memory portion 110 includes six memory banks, BK0 to BK5, because the access pattern ACP that is a pattern of plural pixels set on the screen is constituted of maximum six pixels, which will be described later. If number of the pixels constituting the access pattern ACP is N (N is less than or equals to 6), items of pixel data relative to each target pixel received by the memory portion 110 are stored in N memory banks, BK0 to BK(N−1), with them being divided thereinto.

Figure 12:
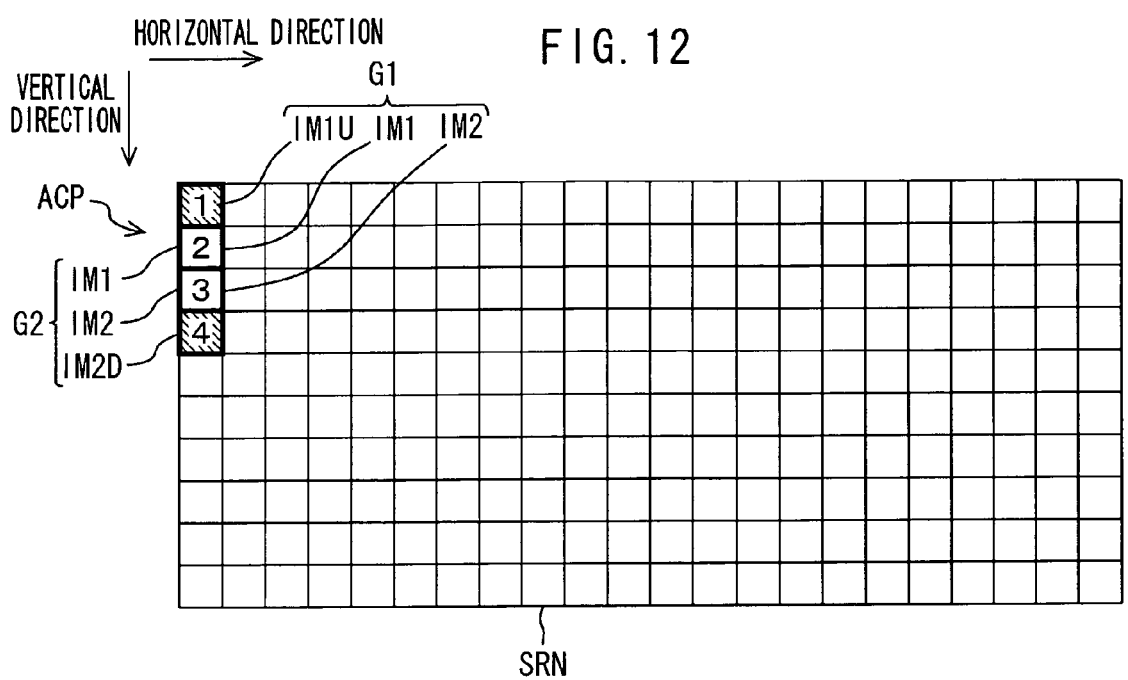
FIG. 12 is a diagram for illustrating an example of a screen on which an access pattern is set.

FIGS. 10 through 12 respectively illustrate examples of screens SRN on which respective access patterns ACP, which are used in this embodiment, are set. In this embodiment, the access pattern ACP is a pattern of two center pixels, IM1, IM2 and peripheral pixels positioned at upper and lower of each of the center pixels, IM1, IM2. It is to be noted that one center pixel and peripheral pixels positioned at a periphery of the center pixel are referred to as "a group of pixels". It is also to be noted that the symbols, "n" shown in FIGS. 10 through 12 indicate any pixels constituting the screen SRN and set positions of the access patterns ACP shown in FIGS. 10 through 12 respectively indicate start positions thereof. In this embodiment, numbers of the pixels in a pixel row extending in a horizontal direction of the screen is fixed as 22 pixels.

In the access pattern ACP shown in FIG. 10, two center pixels, IM1, IM2 are shifted to each other by two pixels in the horizontal direction and by two pixels in the vertical direction. The center pixel IM1 and its peripheral pixels IM1U, IM1D constitute a group of pixels G1 corresponding to the center pixel IM1. The center pixel IM2 and its peripheral pixels IM2U, IM2D constitute a group of pixels G2 corresponding to the center pixel IM2. In this case, an order that respective pixels constituting the two groups of pixels G1, G2 are set as target pixels is successive in each of the groups of pixels. It is to be noted that figures described in the pixels IM1, IM2, IM1U, IM1D, IM2U, and IM2D indicate an order that they are set as a target pixel. It is also to be noted that pixels constituting the two groups of pixels G1, G2 are not overlapped and numbers of pixels constituting the access pattern ACP are six, which are double the numbers of pixels constituting each of the groups of pixels.

In the access pattern ACP shown in FIG. 11, two center pixels, IM1, IM2 are shifted to each other by two pixels in the horizontal direction and by one pixel in the vertical direction. The center pixel IM1 and its peripheral pixels IM1U, IM1D constitute a group of pixels G1 corresponding to the center pixel IM1. The center pixel IM2 and its peripheral pixels IM2U, IM2D constitute a group of pixels G2 corresponding to the center pixel IM2. In this case, an order that respective pixels constituting the two groups of pixels G1, G2 are set as a target pixel is not successive in each of the groups of pixels. It is to be noted that figures described in the pixels IM1, IM2, IM1U, IM1D, IM2U, and IM2D indicate an order that they are set as a target pixel. It is also to be noted that pixels constituting the two groups of pixels G1, G2 are not overlapped and numbers of pixels constituting the access pattern ACP are six, which are double the numbers of pixels constituting each of the groups of pixels.

In the access pattern ACP shown in FIG. 12, two center pixels, IM1, IM2 are not shifted in the horizontal direction and are shifted to each other by one pixel in the vertical direction. The center pixels IM1, IM2 and a peripheral pixel IM1U of the center pixel IM1 constitute a group of pixels G1 corresponding to the center pixel IM1. The center pixels IM1, IM2 and a peripheral pixel IM2D of the center pixel IM2 constitute a group of pixels G2 corresponding to the center pixel IM2. In this case, an order that respective pixels constituting the two groups of pixels G1, G2 are set as target pixels is not successive in each of the groups of pixels. It is to be noted that figures described in the pixels IM1, IM2, IM1U, and IM2D indicate an order that they are set as a target pixel. It is also to be noted that pixels constituting the two groups of pixels G1, G2 are overlapped and numbers of pixels constituting the access pattern ACP are four, which are smaller than that doubles the numbers of pixels constituting each of the groups of pixels.

At a data access, a set position of the access pattern ACP moves from a start position thereof (see FIGS. 10 to 12) based on a raster scan sequence. Then, at each set position that the access pattern ACP moves in a pixel row direction one-by-one pixel, items of pixel data relative to plural pixels (hereinafter referred to as "access pixels" suitably) specified by the access pattern ACP are read out of respective memory banks at the same time. In this case, if numbers of pixels constituting the access pattern ACP are N (N is less than or equals to 6), N items of pixel data specified by the access pattern ACP are read out of respective memory banks BK0 to BK(N−1) at the same time. It is to be noted that N items of pixel data, Do0 to Do(N−1), thus read out at each set position are again input into the memory portion 110 as items of pixel data to be stored in other memory banks.

The data storage control portion 120 operates based on the control signal SCL received through the receiving terminal 180 from a control device, not shown. The data storage control portion 120 performs such a control that items of the pixel data relative to the target pixels can be stored in the plural memory banks in the memory portion 110 with them being divided thereinto. In other words, when the target pixel first corresponds to any one of the N pixels (hereinafter preferably referred to as "early access pixels") specified by the access pattern ACP, the data storage control portion 120 starts storing pixel data relative to this target pixel in a first memory bank, namely, bank BK0 and then, when the target pixel corresponds to any one of the early access pixels, the data storage control portion 120 successively switches the memory bank in which the pixel data relative to this target pixel is stored.

The data access control portion 140 operates based on the control signal SCL received through the receiving terminal 180 from a control device, not shown. This data access control portion 140 performs such a control that at each set position in which the access pattern ACP moves from the start position thereof in a pixel row direction, items of pixel data relative to the N (N is less than or equals to 6) access pixels specified by the access pattern ACP are read out of N memory banks BK0 to BK(n−1) at the same time. It is to be noted that the pixel row direction is a horizontal direction of the screen and the set position of the access pattern ACP moves based on a raster scan sequence.

The data access control portion 140, when the set position of the access pattern ACP moves toward the pixel row direction, stores each item of pixel data read out of the predetermined memory bank in a memory bank that is just before the memory bank that stores the pixel data so as to store respective items of the pixel data relative to the N access pixels specified by the access pattern at the set position in the corresponding separate memory banks.

The selector portion 160 receives items of pixel data, Do0 to Do(N−1), relative to N access pixels acquired from N memory banks, BK0 to BK(N−1), in the memory portion 110 at the same time, and transmits six items of pixel data D1a to D1c, D2a to D2c corresponding to respective pixels constituting each of the groups of pixels G1, G2 corresponding to the above center pixels IM1, IM2 based on the correspondence information INF on input and output. In this case, N access pixels are so arranged that they can be set as a target pixel, at an early storage stage.

As described above, according to a positional relationship between the center pixels, IM1, IM2, an order that the respective pixels constituting the groups of pixels G1, G2 are set as the target pixel may be not successive in each of the groups of pixels (see FIG. 11). Further, pixels constituting the groups of pixels G1, G2 can be overlapped so that numbers of the pixels constituting the access pattern ACP can decrease below six (see FIG. 12).

If an order that the respective pixels constituting the groups of pixels G1, G2 are set as the target pixel is not successive in each of the groups of pixels, the selector portion 160 changes the order of items of the pixel data Do0 to Do(N−1) relative to N access pixels and transmits six items of pixel data D1a to D1c, D2a to D2c corresponding to respective pixels constituting each of the groups of pixels G1, G2.

If pixels constituting the groups of pixels G1, G2 are overlapped so that numbers of the pixels constituting the access pattern ACP can decrease below six, the selector portion 160 sets items of predetermined pixel data from the items of the pixel data Do0 to Do(N−1) relative to N access-pixels as plural items of output pixel data and transmits six items of pixel data D1a to D1c, D2a to D2c corresponding to respective pixels constituting each of the groups of pixels G1, G2.

The selector-portion-setting portion 170 operates based on the control signal SCL received through the receiving terminal 180 from a control device, not shown. This selector-portion-setting portion 170 generates information IAP on the above access pattern ACP based on any information on the center pixels IM1, IM2 and any information on the peripheral pixels positioned at the periphery of each of the center pixels. In this embodiment, the information on the peripheral pixels is information on upper and lower pixels of the center pixel. The selector-portion-setting portion 170 generates the above correspondence information INF on input and output based on order information indicating an order that respective pixels constituting groups of pixels G1, G2 are set as the target pixel at the early storage stage. In this case, it is determined based on the order information whether an order that the respective pixels constituting the groups of pixels G1, G2 are set as the target pixel can be successive in each of the groups of pixels. It is also determined based on the order information whether pixels constituting the groups of pixels G1, G2 are overlapped so that numbers of the pixels constituting the access pattern ACP can decrease below six.

The following will describe operations of the data access apparatus 100 shown in FIG. 9.

The selector-portion-setting portion 170 receives as one of the control signal SCL the information on the center pixels IM1, IM2 and the information on the peripheral pixels positioned at the periphery of each of the center pixels. The selector-portion-setting portion 170 generates the information IAP on the access pattern ACP and the correspondence information INF on input and output based on the information on the center pixels IM1, IM2 and the information on the peripheral pixels positioned at the periphery of each of the center pixels. The information IAP on the access pattern ACP is supplied to the data storage control portion 120 while the correspondence information INF on input and output is supplied to the selector portion 160.

At the early storage stage, the memory portion 110 receives pixel data Di on a predetermined screen to be stored through the receiving terminal 111. The data storage control portion 120 controls such the operation at the early storage stage. In this case, when the target pixel first corresponds to any one of the N (N is less than or equals to 6) early access pixels specified by the access pattern ACP set at the start position thereof, the data storage control portion 120 starts storing pixel data relative to this target pixel in a first memory bank, namely, bank BK0 and then, when the target pixel corresponds to any one of the early access pixels, the data storage control portion 120 successively switches the memory banks in which the pixel data relative to this target pixel is stored.

This allows items of pixel data relative to the target pixels received by the memory portion 110 to be divided and stored into N memory banks BK0 to BK(N−1) separately and allows items of pixel data relative to the plural early access pixels specified by the access pattern ACP set at the start position thereof to be respectively stored in the separate memory banks, thereby enabling these items of pixel data to be accessed at the same time.

At the data access, at each set position in which the access pattern ACP moves from the start position thereof toward a pixel row direction, N items of pixel data, Do0 to Do(N−1), specified by the access pattern ACP are read out of N memory banks, BK0 to BK(n−1), in the memory portion 110 at the same time. The data access control portion 140 controls such the operations at the data access.

When the set position of the access pattern ACP moves toward the pixel row direction, the item of pixel data read out of the predetermined memory bank is stored in a memory bank which is just before the memory bank that stores the pixel data so as to store respective items of the pixel data relative to the N access pixels specified by the access pattern ACP at the set position thereof in the corresponding separate memory banks. This allows items of the pixel data relative to the N access pixels specified by the access pattern ACP to be stored in the separate memory banks at all the set positions when the set position of the access pattern ACP moves from the start position thereof, thereby enabling these items of pixel data to be accessed at the same time.

At the data access, the selector portion 160 receives N items of pixel data, Do0 to Do(N−1), from the N memory banks, BK0 to BK(n−1), in the memory portion 110 at each set position of the access pattern ACP. The selector portion 160 transmits six items of pixel data D1a to D1c, D2a to D2c corresponding to respective pixels constituting each of the groups of pixels G1, G2 corresponding to the above center pixels IM1, IM2. These six items of pixel data D1a to D1c, D2a to D2c are sent to the transmitting terminal 112.

In this case, if an order that the respective pixels constituting the groups of pixels G1, G2 are set as the target pixel at the early storage stage may be not successive in each of the groups of pixels, the order of N items of pixel data, Do0 to Do(N−1), relative to N access pixels is changed. Further, in this case, if pixels constituting the groups of pixels G1, G2 are overlapped so that numbers of the pixels constituting the access pattern ACP can decrease below six, items of predetermined pixel data from the N items of pixel data, Do0 to Do(N−1), relative to N access pixels are set as plural items of the output pixel data.

For example, if the access pattern ACP is a pattern shown in FIG. 10 as described above, items of pixel data Do0, Do1, Do2, Do3, Do4, and Do5 relative to six access pixels IM1U, IM1, IM1D, IM2U, IM2, and IM2D are read out of the six memory banks BK0 to BK5 in the memory portion 110 at each set position of the access pattern ACP at the same time. In this case, the selector portion 160 transmits items of pixel data Do0, Do1, Do2, Do3, Do4, and Do5, respectively, as six items of pixel data, D1a, D1b, D1c, D2a, D2b, and D2c.

For example, if the access pattern ACP is a pattern shown in FIG. 11 as described above, items of pixel data Do0, Do1, Do2, Do3, Do4, and Do5 relative to six access pixels IM1U, IM1, IM2U, IM1D, IM2, and IM2D are read out of the six memory banks BK0 to BK5 in the memory portion 110 at each set position of the access pattern ACP at the same time. In this case, the selector portion 160 transmits items of pixel data Do0, Do1, Do3, Do2, Do4, and Do5, respectively, as six items of pixel data, D1a, D1b, D1c, D2a, D2b, and D2c.

For example, if the access pattern ACP is a pattern shown in FIG. 12 as described above, items of pixel data Do0, Do1, Do2, and Do3 relative to four access pixels IM1U, IM1, IM2, and IM2D are read out of the four memory banks BK0 to BK3 in the memory portion 110 at each set position of the access pattern ACP at the same time. In this case, the selector portion 160 transmits items of pixel data Do0, Do1, Do2, Do1, Do2, and Do3, respectively, as six items of pixel data, D1a, D1b, D1c, D2a, D2b, and D2c.

The following will described detailed configurations of the data storage control portion 120, the data access control portion 140, the selector portion 160, and the selector-portion-setting portion.

Figure 13:
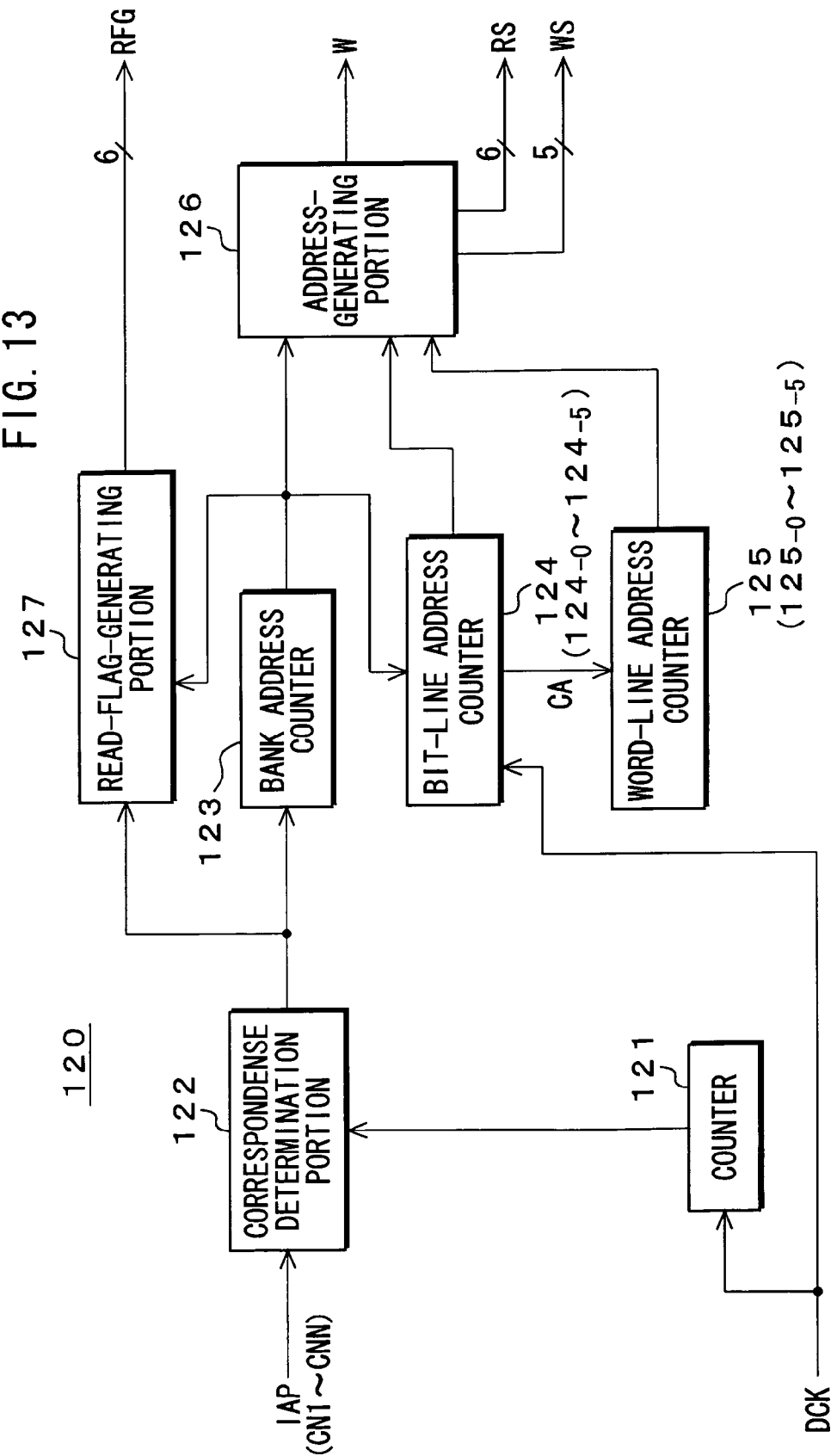
FIG. 13 is a block diagram for showing a configuration of a data storage control portion constituting the embodiment of the data access apparatus according to the invention.

The data storage control portion 120 will be described. FIG. 13 shows a configuration of the data storage control portion 120. The data storage control portion 120 has a counter 121, a correspondence determination portion 122, a bank address counter 123, a bit-line address counter 124, a word-line address counter 125, an address-generating portion 126, and a read-flag-generating portion 127.

The counter 121 counts numbers of items of received pixel data relative to each target pixel that the above memory portion 110 sequentially receives. The counter 121 receives a data clock DCK that is synchronized with pixel data relative to each target pixel received by the memory portion 110. The control signal SCL includes this data clock DCK which a control device, not shown, supplies. The counter 121 first sets its count value to be zero and then, increments the count value using the data clock DCK for every time when the memory portion 110 receives the pixel data relative to each target pixel.

The correspondence determination portion 122 determines whether a target pixel corresponds to any one of N pixels (early access pixels) specified by the access pattern ACP set at the start position thereof for every time when the memory portion 110 receives the pixel data relative to a predetermined target pixel. Thus, the correspondence determination portion 122 receives as the information IAP on the access pattern any count values CN1 to CNN that are transmitted from the counter 121 when the target pixel corresponds to the respective N pixels. The correspondence determination portion 122 receives this information IAP on the access pattern from the selector-portion-setting portion 170. The correspondence determination portion 122 determines that the target pixel is any one of first to Nth early access pixels when a counter value of the counter 121 relative to a target pixel corresponds to any one of count values CN1 to CNN.

The bank address counter 123 transmits a bank address, namely, a count value indicating a memory bank that stores pixel data relative to the target pixel, among six memory banks BK0 to BK5. The bank address counter 123 receives determination output from the correspondence determination portion 122. The bank address counter 123 sets its first count value to be zero and then, increments its count value when the target pixel corresponds to a second early access pixel or later. The count values 0 to 5, namely, the bank addresses 0 to 5 of the bank address counter 123 respectively indicate the memory banks BK0 to BK5.

The bit-line address counter 124 has six counters 124-0 to 124-5, each of which corresponds to any six memory banks BK0 to BK5. The bit-line address counter 124 receives the data clock DCK that is synchronized with pixel data relative to each target pixel received by the memory portion 110. The counters 124-0 to 124-5 respectively set their counter values, namely, their bit-line addresses to be zero at the first time. Any counter corresponding to the bank address among the counters, 124-0 to 124-5, increments its counter value for every time when the memory portion 110 receives and stores pixel data relative to each target pixel. In this embodiment, each of the memory banks BK0 to BK5 has a length of word line of 10. Thus, in the counters, 124-0 to 124-5, a count value is set to be zero following a count value of nine, which shows that these counters have a decimal counter configuration.

The word-line address counter 125 has six counters 125-0 to 125-5, each of which corresponds to any six memory banks BK0 to BK5. The word-line address counters 125-0 to 125-5, respectively receive a carry signals CA of the counters, 124-0 to 124-5. The counters 125-0 to 125-5, increment their count values for every time when they receive the carry signals CA from the counters, 124-0 to 124-5.

The address-generating portion 126 generates a write address W and supplies it to the memory portion 110. The address-generating portion 126 receives any count values from the counters 123 to 125. The address-generating portion 126 combines a count value of the word-line address count 125 (a bank address), a count value (a bit-line address) of a counter corresponding to the bank address among the six counters 124-0 to 124-5 constituting the counter 124, and a count value (a word-line address) of a counter corresponding to the bank address among the six counters 125-0 to 125-5 constituting the counter 125 to generate the write address W to be supplied to the memory portion 110.

The address-generating portion 126 also generates a read-starting address RS and a write-starting address WS, for N (N is less than or equals to 6) memory banks, BK0 to BK(N−1), that store pixel data at the early storage stage. These starting addresses RS, WS are respectively used in the data access control portion 140. In this case, relative to the memory banks, BK0 to BK(N−1), the address-generating portion 126 sets write address in which first pixel data is stored as the read-starting address RS for the memory banks, BK0 to BK(N−1). Further, relative to the memory banks, BK0 to BK(N−2), the address-generating portion 126 sets an address next to an address in which last pixel data is stored as the write-starting address WS for the memory banks, BK0 to BK(N−2).

The read-flag-generating portion 127 generates a read flag RFG for the respective memory banks BK0 to BK5, which is used in the data access control portion 140. The read-flag-generating portion 127 receives any determination outputs from the correspondence determination portion 122 and the counter value (the bank address) from the bank address counter 123. Relative to the six memory banks, BK0 to BK5, the read-flag-generating portion 127 sets the read flag RFG relative to a memory bank in which the pixel data corresponding to any of the N early access pixels specified by the access pattern ACP set at the start position thereof is stored to a flag-on state such as 1, indicating that read-out is available and sets any read flags RFG relative to other memory banks to a flag-off state such as 0, indicating that read-out is unavailable.

Figure 14:
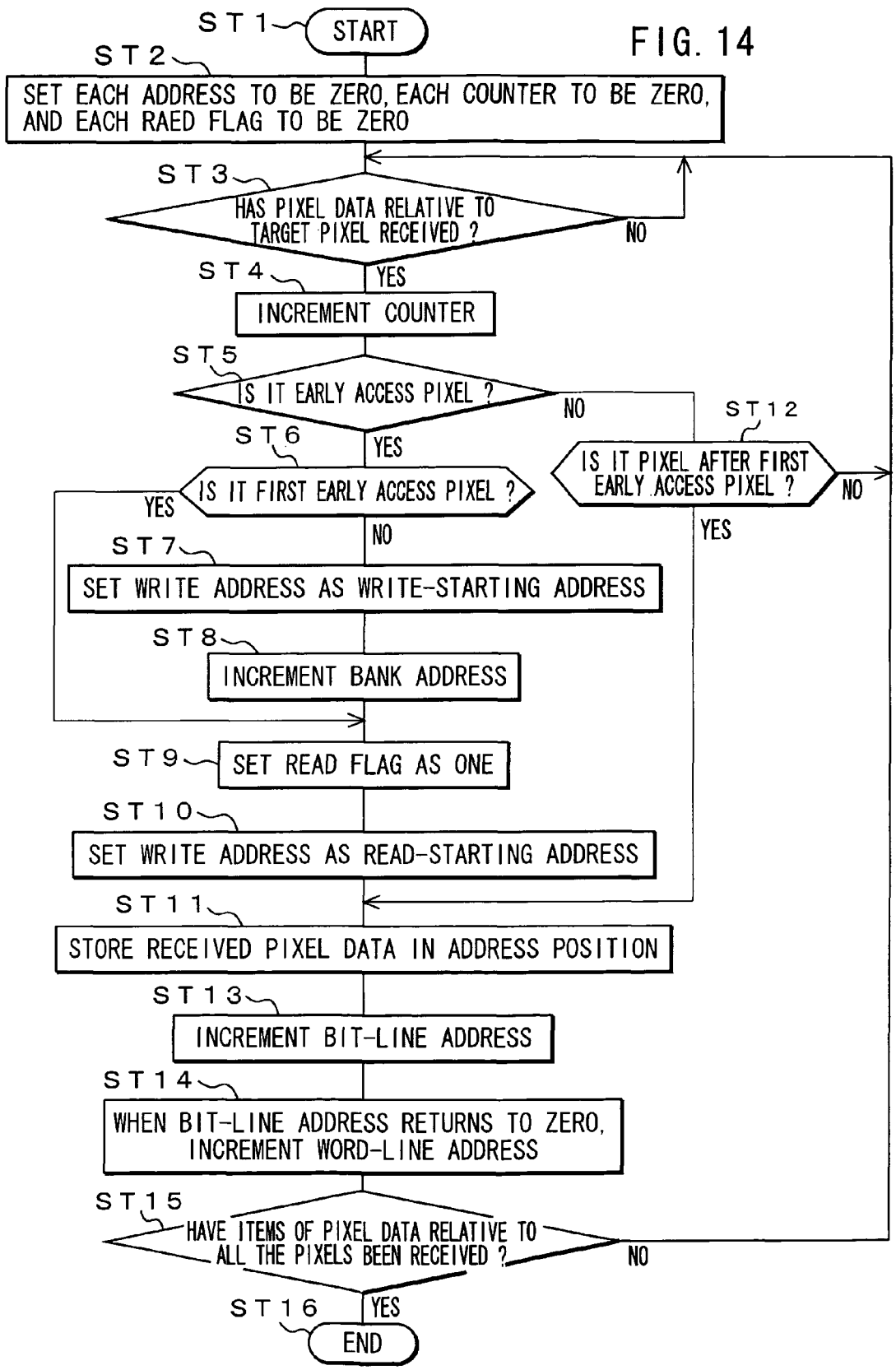
FIG. 14 is a flowchart for showing operations of the data access apparatus under the control of the data storage control portion when starting the storage.

Next, the following will describe operations of the data access apparatus 100 when starting the storage under the control of the data storage control portion 120 shown in FIG. 13 with reference to the flowchart shown in FIG. 14. It is to be noted that the data storage control portion 120 is composed of, for example, a micro-processor and performs any control operations based on a data storage control program that a program memory, not shown, stores.

At a step ST1, the data access apparatus 100 starts its operations. At a step ST2, the count value (the bank address) of the bank address counter 123, the count values (the bit-line address) of the six counters 124-0 to 124-5 constituting the bit-line address counter 124, and the count values (the word-line address) of the six counters 125-0 to 125-5 constituting the bit-line address counter 124 are respectively set to be zero. The count values of the counter 121 is set to be zero. The read flags RE corresponding to each of the memory banks, BK0 to BK5, which are supplied from the read-flag-generating portion 127, are set to a flag-off state indicating no read-out such as 0.

Next, at a step ST 3, it is determined whether pixel data relative to a target pixel has been received. In this case, when the data clock DCK is received, it is determined that the pixel data relative to the target pixel has been received. If it is determined that the pixel data relative to the target pixel has been received, the counter 121 is incremented at a step ST4.

At a step ST5, the correspondence determination portion 122 determines whether the target pixel received at the step ST3 corresponds to any early access pixels. In this case, when the count value of the counter 121 corresponds to any one of the count values CN1 to CNN as the information on access pattern IAP, it is determined that the target pixel corresponds to the early access pixel.

If it is determined that the target pixel corresponds to the early access pixel, it is determined at a step ST6 whether this early access pixel is a first access pixel. If it is determined that the early access pixel is a first access pixel, the process goes directly to a step ST9. On the other hand, if it is determined that the early access pixel is not a first access pixel, a write address W is set as a write-starting address WS of the memory bank corresponding to the bank address at a step ST7.

It is to be noted that the write address W is generated by combining the above bank address, the bit-line address, and the word-line address in the address-generating portion 126. The bit-line address is given as count values of the counters in the bit-line address counter 124 corresponding to the bank address. The word-line address is given as count values of the counters in the word-line address counter 125 corresponding to the bank address.

At a step ST8, the bank address counter 123 increments its count value (the bank address). The process then goes to a step ST 9. At the step ST9, the read-flag-generating portion 127 sets the read flag REF of the memory bank corresponding to the bank address to the flag-on state thereof indicating that read-out thereof is available, such as 1. At a step ST10, the write address W generated in the address-generating portion 126 is set as a read-starting address RS of the memory bank corresponding to the bank address. Then, the process goes to the step ST11.

If it is determined that the target pixel does not correspond to the early access pixel at the step ST5, the process goes to a step ST12 where it is determined whether this target pixel is a pixel after the first early access pixel. If it is determined that this target pixel is not a pixel after the first early access pixel, the process goes back to the step ST3 where it waits for receiving any pixel data relative to a next target pixel. On the other hand, if it is determined that the target pixel is a pixel after the first early access pixel, the process goes directly to a step ST11.

At the step ST11, based on the write address W generated in the address-generating portion 126, pixel data of the target pixel is stored in an address position of the memory bank specified by the bank address of the write address W, which is specified by the bit-line address and the word-line address of the write address W.

At a step ST13, a count value (the bit-line address) of the counter corresponding to the bank address of the bit-line address counter 124 is incremented. At a step ST14, when the count value of the counter becomes zero at the step ST13, a count value (the word-line address) of the counter corresponding to the bank address of the word-line address counter 125 is incremented based on the carry signal CA received from any counters in the bit-line address counter 124. The process then goes to a step ST15.

At the step ST15, it is determined whether items of pixel data relative to all the pixels in the screen SRN have been received. In this case, if the count value of the counter 121 equals to the number of pixels constituting the screen SRN, it is determined that items of pixel data relative to all the pixels in the screen SRN have been received. Thus, when it is determined that items of pixel data relative to all the pixels have been received, the process goes to a step ST16 where the operation is completed. On the other hand, when it is determined that items of pixel data relative to all the pixels have been not yet received, the process goes back to a step ST3 where it waits to receive any pixel data relative to next target pixel.

The above operation of the data access apparatus 100 when starting the storage allows each of the items of pixel data in the screen SRN to be stored in each memory bank with them being divided thereto.

Figure 15:
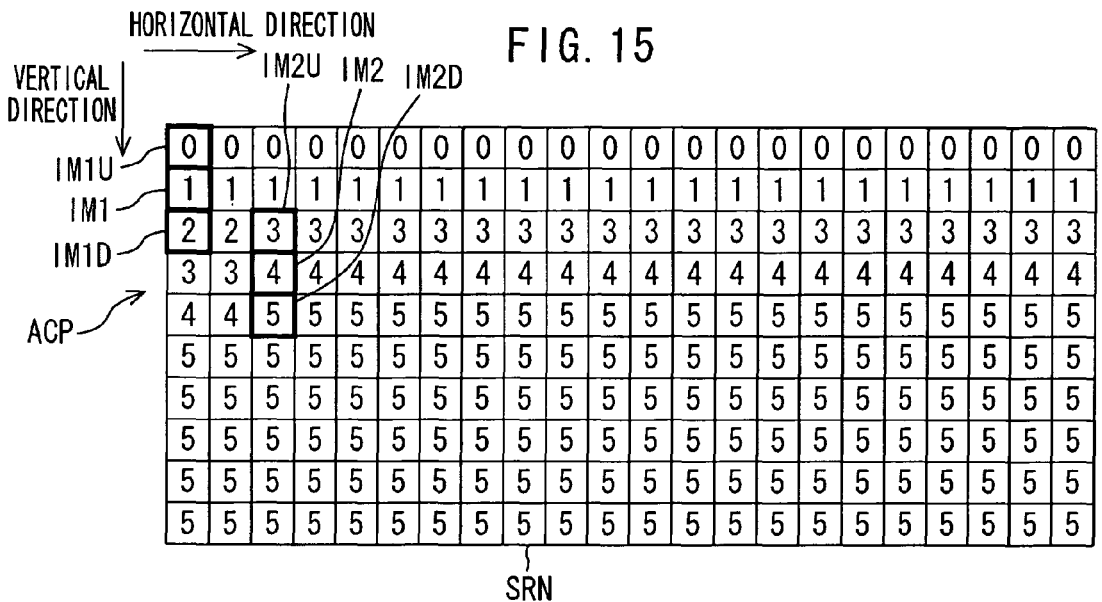
FIG. 15 is a diagram for illustrating an example of a screen in which items of pixel data are stored in six memory banks when starting the storage of pixel data relative to the access pattern shown in FIG. 10.
Figure 16:
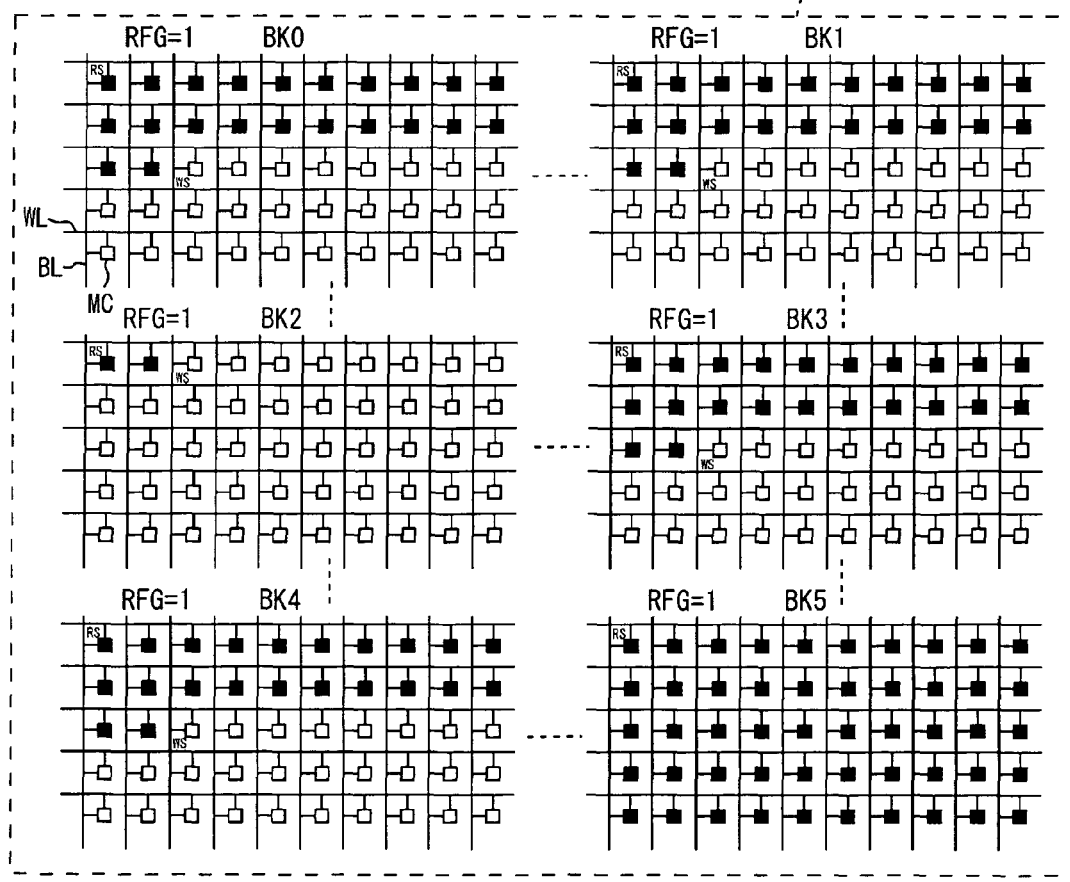
FIG. 16 is a schematic diagram for illustrating an example of the memory portion in which items of pixel data are stored in the memory banks after the start of data storage relative to the access pattern shown in FIG. 10.

FIG. 15 illustrates items of pixel data relative to pixels when starting the storage of pixel data relative to the access pattern ACP shown in FIG. 10. It is to be noted that figures described in the symbols, "□" shown in FIG. 15 indicate any bank addresses in a figured bank which stores pixel data relative to the pixel. In this case, numbers "0" to "5" indicate the memory banks BK0 to BK5, respectively. FIG. 16 illustrates data storage states in the memory banks, BK0 to BK5, in this case. It is to be noted that the symbol, "■" shown in FIG. 16 indicates a memory cell MC in which item of pixel data is stored while the symbol, "□" shown in FIG. 16 indicates a memory cell MC in which no item of pixel data is stored. This is similar to the following figures.

First, the address bank is set to be zero. In this case, a top pixel of the first line is set as a target pixel. This target pixel is a first early access pixel IM1U specified by the access pattern ACP. Therefore, the read flag RFG for the memory bank BK0 is set as a flag-on state, for example, 1 indicating that read-out is available. The apparatus starts storing the pixel data relative to the pixel IM1U in the memory bank BK0. In this case, the write address W indicating an address position in which pixel data relative to the pixel IM1U is stored is set as a read-starting address RS of the memory bank BK0 (see memory bank BK0 shown in FIG. 16).

Then, pixels following this pixel IM1U are sequentially set as target pixels and their items of pixel data are stored in the memory bank BK0. A first pixel of a second line is a second early access pixel IM1. When the pixel IM1 is a target pixel, the bank address is incremented so as to be one, thereby causing a memory bank that stores pixel data to be set as a memory bank BK1.

In this moment, the memory bank BK0 has stored items of pixel data relative to 22 pixels (see first 22 address positions in the memory bank BK0 shown in FIG. 16). In this case, write-starting address WS in the memory bank BK0 is an address indicating an address position next to an address position in which the last pixel data, in other words, pixel data of 22nd pixel is stored (see memory bank BK0 shown in FIG. 16).

As described above, when the pixel IM1 is a target pixel, a memory bank that stores pixel data is set as the memory bank BK1. Thus, the read flag RFG for the memory bank BK1 is set as a flag-on state, for example, 1 indicating that read-out is available. The apparatus starts storing pixel data relative to the pixel IM1 in the memory bank BK1. In this case, the write address W indicating an address position in which pixel data relative to the pixel IM1 is stored is set as a read-starting address RS of the memory bank BK1 (see memory bank BK1 shown in FIG. 16).

Then, pixels following this pixel IM1 are sequentially set as target pixels and their items of pixel data are stored in the memory bank BK1. A first pixel of a third line is a third early access pixel IM1D. When the pixel IM1D is a target pixel, the bank address is incremented so as to be two, thereby causing a memory bank that stores pixel data to be set as a memory bank BK2.

In this moment, the memory bank BK1 has stored items of pixel data relative to 22 pixels (see first 22 address positions in the memory bank BK1 shown in FIG. 16). In this case, write-starting address WS in the memory bank BK1 is an address indicating an address position next to an address position in which the last pixel data, in other words, pixel data of 22nd pixel is stored (see memory bank BK1 shown in FIG. 16).

As described above, when the pixel IM1D is a target pixel, a memory bank that stores pixel data is set as the memory bank BK2. Thus, the read flag RFG for the memory bank BK2 is set as a flag-on state, for example, 1 indicating that read-out is available. The apparatus starts storing the pixel data relative to the pixel IM1D in the memory bank BK2. In this case, the write address W indicating an address position in which pixel data relative to the pixel IM1D is stored is set as a read-starting address RS of the memory bank BK2 (see memory bank BK2 shown in FIG. 16).

Then, pixels following this pixel IM1D are sequentially set as target pixels and their items of pixel data are stored in the memory bank BK2. A third pixel of the third line is a fourth early access pixel IM2U. When the pixel IM2U is a target pixel, the bank address is incremented so as to be three, thereby causing a memory bank that stores pixel data to be set as a memory bank BK3.

In this moment, the memory bank BK2 has stored items of pixel data relative to 2 pixels (see first 2 address positions in the memory bank BK2 shown in FIG. 16). In this case, write-starting address WS in the memory bank BK2 is an address indicating an address position next to an address position in which the last pixel data, in other words, pixel data of 2nd pixel is stored (see memory bank BK2 shown in FIG. 16).

As described above, when the pixel IM2U is a target pixel, a memory bank that stores pixel data is set as the memory bank BK3. Thus, the read flag RFG for the memory bank BK3 is set as a flag-on state, for example, 1 indicating that read-out is available. The apparatus starts storing the pixel data relative to the pixel IM2U in the memory bank BK3. In this case, the write address W indicating an address position in which pixel data relative to the pixel IM2U is stored is set as a read-starting address RS of the memory bank BK3 (see memory bank BK3 shown in FIG. 16).

Then, pixels following this pixel IM2U are sequentially set as target pixels and their items of pixel data are stored in the memory bank BK3. A third pixel of a fourth line is a fifth early access pixel IM2. When the pixel IM2 is a target pixel, the bank address is incremented so as to be four, thereby causing a memory bank that stores pixel data to be set as a memory bank BK4.

In this moment, the memory bank BK3 has stored items of pixel data relative to 22 pixels (see first 22 address positions in the memory bank BK3 shown in FIG. 16). In this case, write-starting address WS in the memory bank BK3 is an address indicating an address position next to an address position in which the last pixel data, in other words, pixel data of 22nd pixel is stored (see memory bank BK3 shown in FIG. 16).

As described above, when the pixel IM2 is a target pixel, a memory bank that stores pixel data is set as the memory bank BK4. Thus, the read flag RFG for the memory bank BK4 is set as a flag-on state, for example, 1 indicating that read-out is available. The apparatus starts storing the pixel data relative to the pixel IM2 in the memory bank BK4. In this case, the write address W indicating an address position in which pixel data relative to the pixel IM2 is stored is set as a read-starting address RS of the memory bank BK4 (see memory bank BK4 shown in FIG. 16).

Then, pixels following this pixel IM2 are sequentially set as target pixels and their items of pixel data are stored in the memory bank BK4. A third pixel of a fifth line is a sixth early access pixel IM2D. When the pixel IM2D is a target pixel, the bank address is incremented so as to be five, thereby causing a memory bank that stores pixel data to be set as a memory bank BK5.

In this moment, the memory bank BK4 has stored items of pixel data relative to 22 pixels (see first 22 address positions in the memory bank BK4 shown in FIG. 16). In this case, write-starting address WS in the memory bank BK4 is an address indicating an address position next to an address position in which the last pixel data, in other words, pixel data of 22nd pixel is stored (see memory bank BK4 shown in FIG. 16).

As described above, when the pixel IM2D is a target pixel, a memory bank that stores pixel data is set as the memory bank BK5. Thus, the read flag RFG for the memory bank BK5 is set as a flag-on state, for example, 1 indicating that read-out is available. The apparatus starts storing the pixel data relative to the pixel IM2D in the memory bank BK5. In this case, the write address W indicating an address position in which pixel data relative to the pixel IM2D is stored is set as a read-starting address RS of the memory bank BK5 (see memory bank BK5 shown in FIG. 16).

Then, pixels following this pixel IM2D are sequentially set as target pixels and their items of pixel data are stored in the memory bank BK5. Items of pixel data are stored in the memory bank BK5 up to the last pixel constituting the screen SRN and then, storage operation of the pixel data is completed. It is to be noted that the memory bank BK5 shown in FIG. 16 shows only a part of memory cells MC that store the pixel data (see the symbols "■" therein).

The above operations of early storage have been described relative to the access pattern ACP shown in FIG. 10. The similar operations of early storage thereto perform relative to the access patterns ACP shown in FIGS. 11 and 12, detailed description of which will be omitted.

Figures 17, 18:
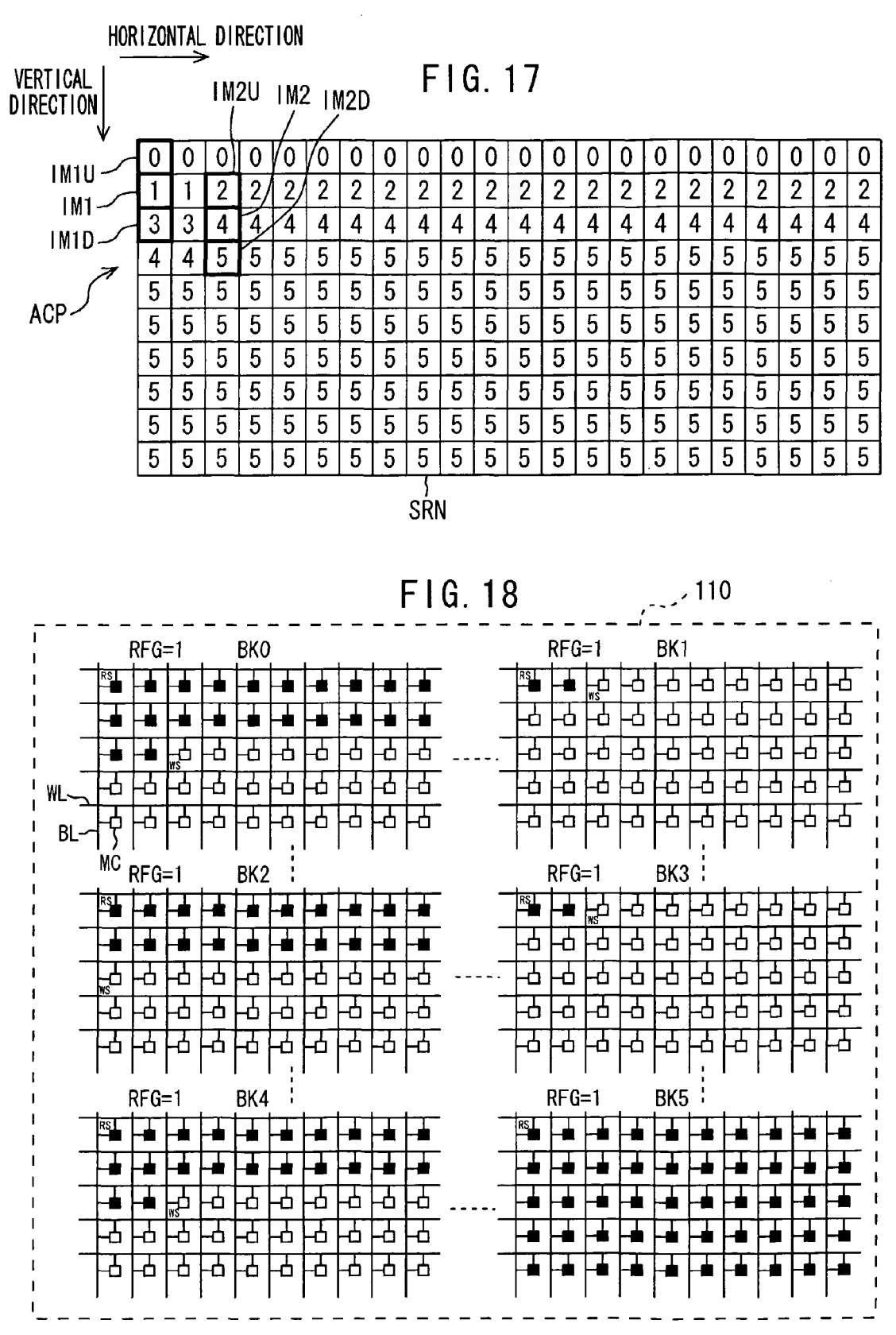

FIG. 17 illustrates items of pixel data relative to any pixels when starting the storage of pixel data relative to the access pattern ACP shown in FIG. 11. FIG. 18 illustrates data storage states in the memory banks, BK0 to BK5, in the case shown in FIG. 17. In this embodiment, numbers of early access pixels specified by the access pattern ACP are six and items of the pixel data relative to the pixels are stored in the memory banks, BK0 to BK5, with them being divided thereto.

Figure 19:
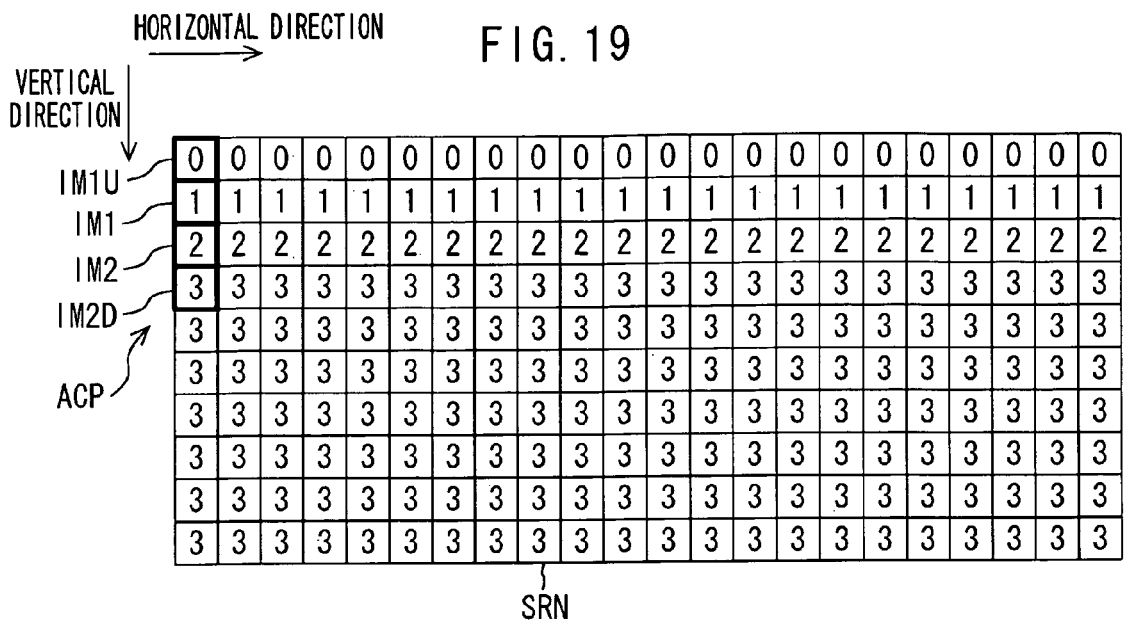
FIG. 19 is a diagram for illustrating an example of a screen in which items of pixel data are stored in six memory banks when starting the storage of pixel data relative to the access pattern shown in FIG. 12.
Figure 20:
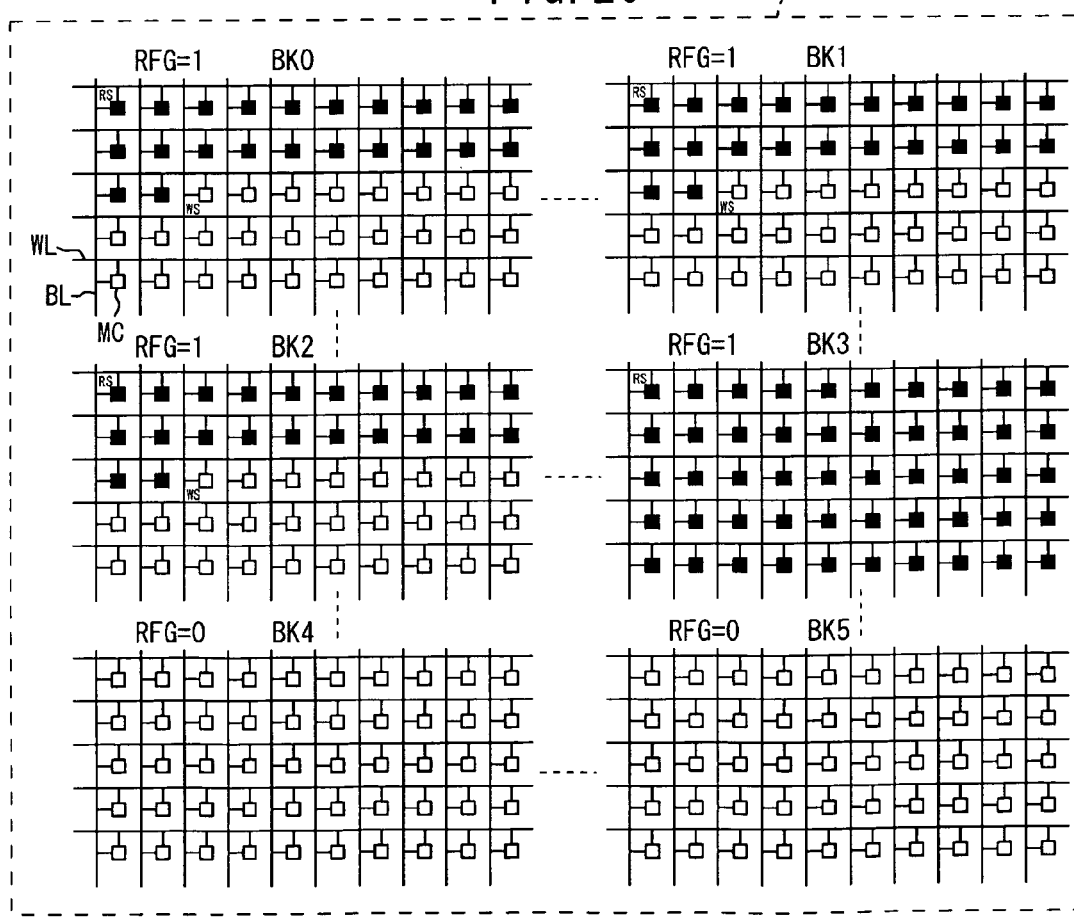
FIG. 20 is a schematic diagram for illustrating an example of the memory portion in which items of pixel data are stored in the memory banks after the start of data storage relative to the access pattern shown in FIG. 12.

FIG. 19 illustrates items of pixel data relative to any pixels when starting the storage of pixel data relative to the access pattern ACP shown in FIG. 12. FIG. 20 illustrates data storage states in the memory banks, BK0 to BK5, in the case shown in FIG. 19. In this embodiment, numbers of early access pixels specified by the access pattern ACP are four and items of the pixel data relative to the pixels are stored in the memory banks, BK0 to BK3, with them being divided thereto. The memory banks BK4 and BK5 store no item of the pixel data.

Figure 21:
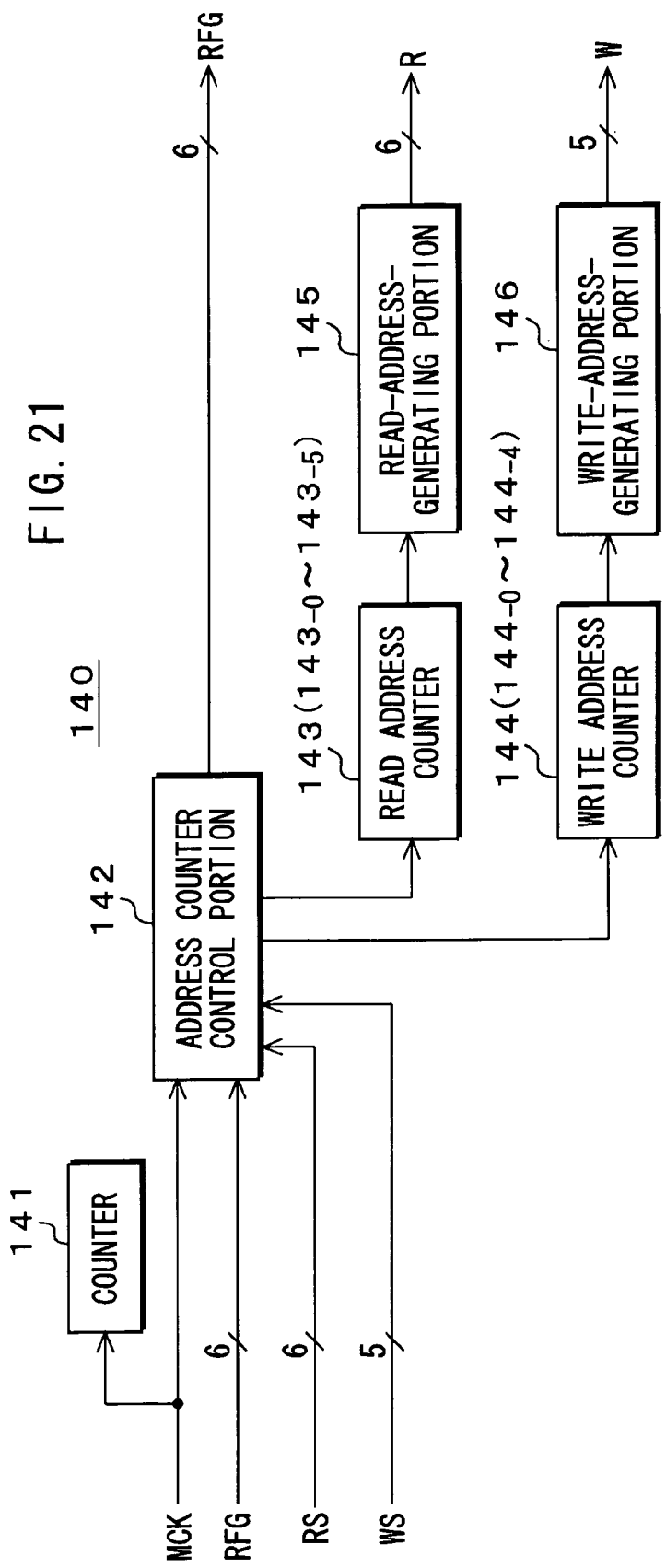
FIG. 21 is a block diagram for showing a configuration of a data access control portion constituting the embodiment of the data access apparatus according to the invention.

The following will describe the data access control portion 140. FIG. 21 shows a configuration of the data access control portion. The data access control portion 140 has a counter 141, an address counter control portion 142, a read address counter 143, a write address counter 144, a read-address-generating portion 145, and a write-address-generating portion 146.

The counter 141 transmits a count value indicating a set position of the access pattern ACP. The counter 141 receives moving clock MCK for moving the set position of the access pattern ACP. The moving clock MCK constitutes one of the above control signals SCL and is supplied from a control device, not shown. The counter 141 first sets its count value to be zero and then, increments the count value so as to be one using a first moving clock MCK after the set position of the access pattern ACP is set as its start position. Further, the counter 141 increments its count value using the moving clock MCK for every time when the set position of the access pattern ACP moves toward pixel row direction one-by-one pixel.

The read address counter 143 has six counters 143-0 to 143-5 corresponding to six memory banks BK0 to BK5, respectively. Respective six counters 143-0 to 143-5 include a bit-line address counter for obtaining a count value indicating a bit-line address and a word-line address counter for obtaining a count value indicating a word-line address (see the bit-line address counter 124 and the word-line address counter 125 that are shown in FIG. 13). The six counters 143-0 to 143-5 of the read address counter 143 respectively transmit count values indicating read addresses (a bit-line address and a word-line address) for the six memory banks BK0 to BK5 under the control of the address counter control portion 142.

The write address counter 144 has five counters 144-0 to 144-4 corresponding to five memory banks BK0 to BK4, respectively. Respective five counters 144-0 to 144-4 include a bit-line address counter for obtaining a count value indicating a bit-line address and a word-line address counter for obtaining a count value indicating a word-line address. The five counters 144-0 to 144-4 of the write address counter 144 respectively transmit count values indicating write addresses (a bit-line address and a word-line address) for the five memory banks BK0 to BK4 under the control of the address counter control portion 142.

The address counter control portion 142 controls operations of the above read address counter 143 and the above write address counter 144. The address counter control portion 142 receives the moving clock MCK for moving the set position of the access pattern ACP, the read-starting address RS and the write-starting address WS, for N (N is less than or equals to 6) memory banks, BK0 to BK(N−1), which are generated in the address-generating portion 126 in the data storage control portion 120, and the read flag RFG for the memory banks, BK0 to BK5, which are generated in the read-flag-generating portion 127 in the data storage control portion 120. It is to be noted that N (N is less than or equals to 6) memory banks, BK0 to BK(N−1), store pixel data when starting the storage.

The address counter control portion 142 first sets the read-starting address RS for each of the N (N is less than or equals to 6) memory banks, BK0 to BK(N−1), to N counters 143-0 to 143-(N−1) in the read address counter 143. The address counter control portion 142 also sets the write-starting address WS for each of the N−1 memory banks, BK0 to BK(N−2), to N−1 counters 144-0 to 144-(N−2) in the write address counter 144.

At each set position of the access pattern ACP, the address counter control portion 142 increments count values of the N counters 143-0 to 143-(N−1) in the read address counter 143 for every time when reading any pixel data and increments count values of the N−1 counters 144-0 to 144-(N−2) in the write address counter 144 for every time when writing any pixel data.

The address counter control portion 142 also constitutes the read-flag-generating portion and generates the read flag RFG for each of the memory banks, BK0 to BK5. In this case, the address counter control portion 142 sets the read flag RFG for N memory banks, BK0 to BK(N−1), that store any pixel data when starting the storage to its flag-on state, for example, 1 indicating that the read-out is available and the read flag RFG for other memory bank(s) to its(their) flag-off state, for example, 0 indicating that the read-out is unavailable, based on the read flags RFG for respective memory bank, BK0 to BK5, which are received from the above data storage control portion 120.

The read-address-generating portion 145 generates read addresses R for each of the six memory banks, BK0 to BK5. The read-address-generating portion 145 receives count values (a bit-line address and a word-line address) from the respective counters constituting the read address counter 143. The read-address-generating portion 145 combines the respective count values (a bit-line address and a word-line address) of the respective counters with the bank addresses of the memory banks, BK0 to BK5, to generate the read addresses R for each of the memory banks, BK0 to BK5.

The write-address-generating portion 146 generates write addresses W for each of the five memory banks, BK0 to BK4. The write-address-generating portion 146 receives count values (a bit-line address and a word-line address) from the respective counters constituting the write address counter 144. The write-address-generating portion 146 combines the respective count values (a bit-line address and a word-line address) of the respective counters with the bank addresses of the memory banks, BK0 to BK4, to generate the write addresses W for each of the memory banks, BK0 to BK4.

Figure 22:
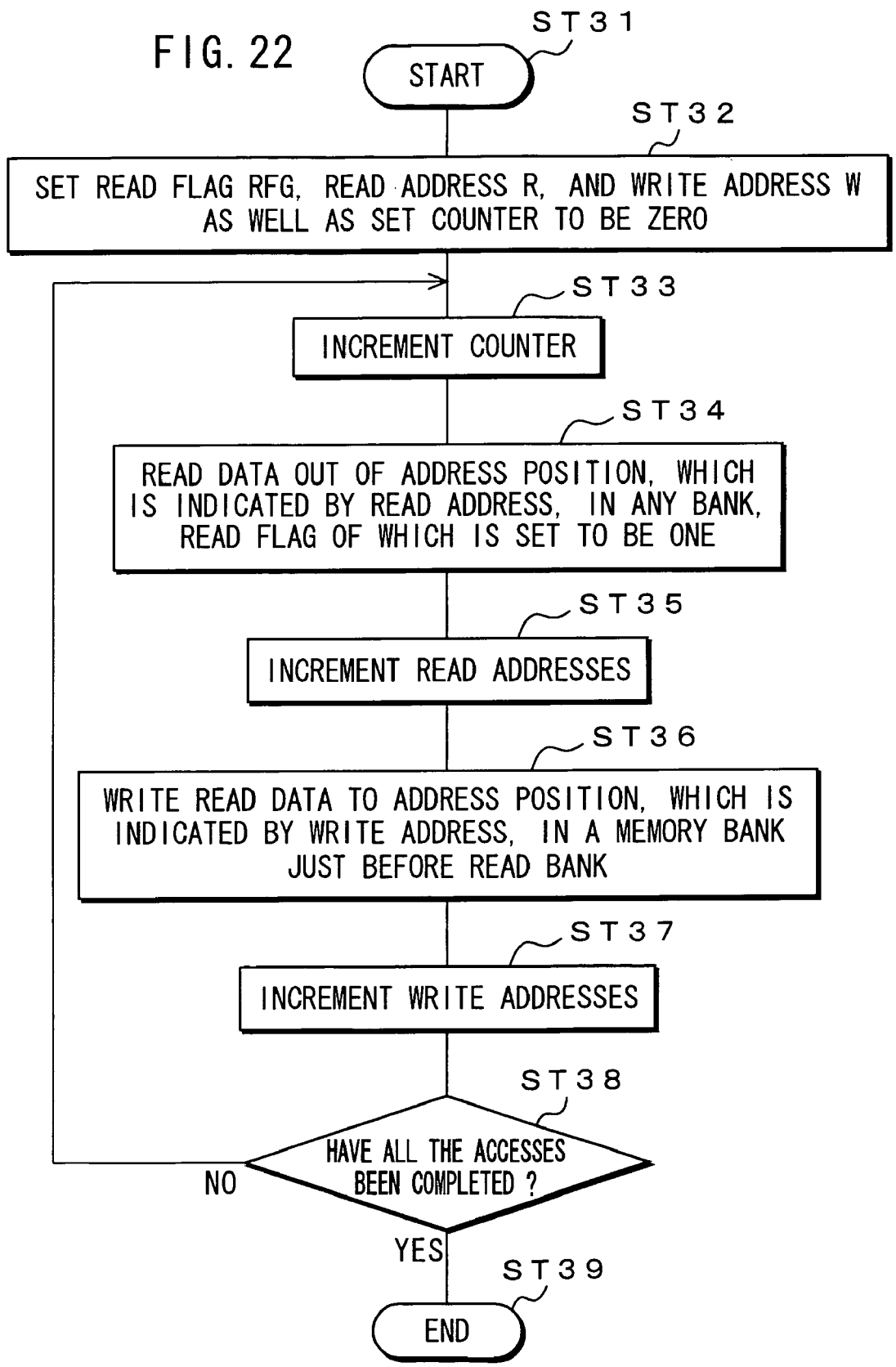
FIG. 22 is a flowchart for showing operations of the data access apparatus under the control of the data access control portion when accessing the data.

The following will describe operations of the data access apparatus 100 when accessing the data under the control of the data access control portion 140 shown in FIG. 21 with reference to a flowchart shown in FIG. 22. It is to be noted that the data access control portion 140 is composed of, for example, a micro-processor, and performs any control operations under data access control program that is stored in a program memory, not shown.

At a step ST31, the data access apparatus 100 starts its operation. At a step ST32, the data access control portion 140 sets the read flag RFG, the read address R, and the write address W as well as sets the count value of the counter 141 to be zero. In this case, the read flags RFG for the memory banks, BK0 to BK5, are respectively set so as to be equal to the read flags RFG received from the data storage control portion 120. Further, in this case, count values (read addresses) of the N counters 143-0 to 143-(N−1) in the read address counter 143 are respectively set so as to be equal to the read-starting address RS received from the data storage control portion 120. Count values (write addresses) of the N−1 counters 144-0 to 144-(N−2) in the write address counter 144 are respectively set so as to be equal to the write-starting address WS received from the data storage control portion 120.

Next, at a step ST33, using the moving clock MCK, the counter 141 is incremented. At a step ST34, items of pixel data Do0 to Do(N−1) relative to the N (N is less than or equals to 6) access pixels specified by the access pattern ACP are read out of any address positions, which are indicated by the read addresses R generated by the read-address-generating portion 145, in the N memory banks, BK0 to BK(N−1), in which the read flag RFG is set to its flag-on state, for example, 1 and are output.

At a step ST35, count values (read addresses) of the N counters 143-0 to 143-(N−1), which correspond to N memory banks, BK0 to BK(N−1), that have been read the pixel data at the step ST34, in the read address counter 143 are incremented.

At a step ST36, items of pixel data read out of any predetermined one of the memory banks are stored in a memory bank just before the predetermined memory bank. In this case, items of pixel data read out of the memory banks BK1 to BK(N−1) are respectively written to address positions of the N−1 memory banks BK0 to BK(N−2) indicated by the write address W that is generated in the write-address-generating portion 146.

At a step ST37, count values (write addresses) of the N−1 counters 144-0 to 144-(N−2), which correspond to N−1 memory banks, BK0 to BK(N−2), that have been written the pixel data at the step ST36, in the write address counter 144 are incremented.

At a step ST38, it is determined whether all the accesses have been completed, namely, whether the access pattern ACP has moved from its start position to its final position. In this case, when the count value of the counter 141 is a value indicating its final position, it is determined that all the accesses have been completed. If it is determined whether all the accesses have been completed, the process goes to a step ST39 where the data access apparatus 100 finishes its operation. If not, the process goes back to the step ST33 where the apparatus 100 continues to perform any processing on following set positions of the access pattern ACP.

Figure 23:
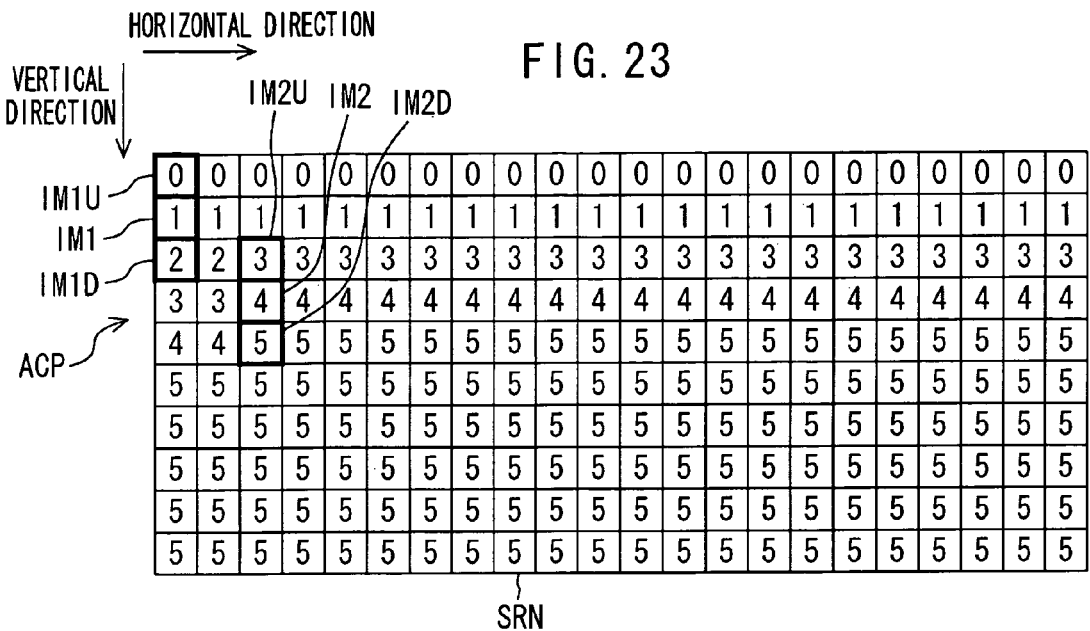
FIG. 23 is a diagram for illustrating an example of a screen in which items of pixel data are stored in six memory banks when the access pattern stays in its start position.

Further, such the operations at the data access will be described more in detail. As described above, if the access pattern ACP is a pattern shown in FIG. 10, items of pixel data relative to the pixels in a screen SRN are stored in the six memory banks, BK0 to BK5 with them divided thereto, according to the operations when starting the storage. FIG. 23 illustrates items of pixel data relative to the pixels when starting the storage of pixel data relative to the access pattern ACP. It is to be noted that figures described in the symbols, "□" shown in FIG. 23 indicate any bank addresses in each of the memory bank which store pixel data relative to the pixels.

Figure 24:
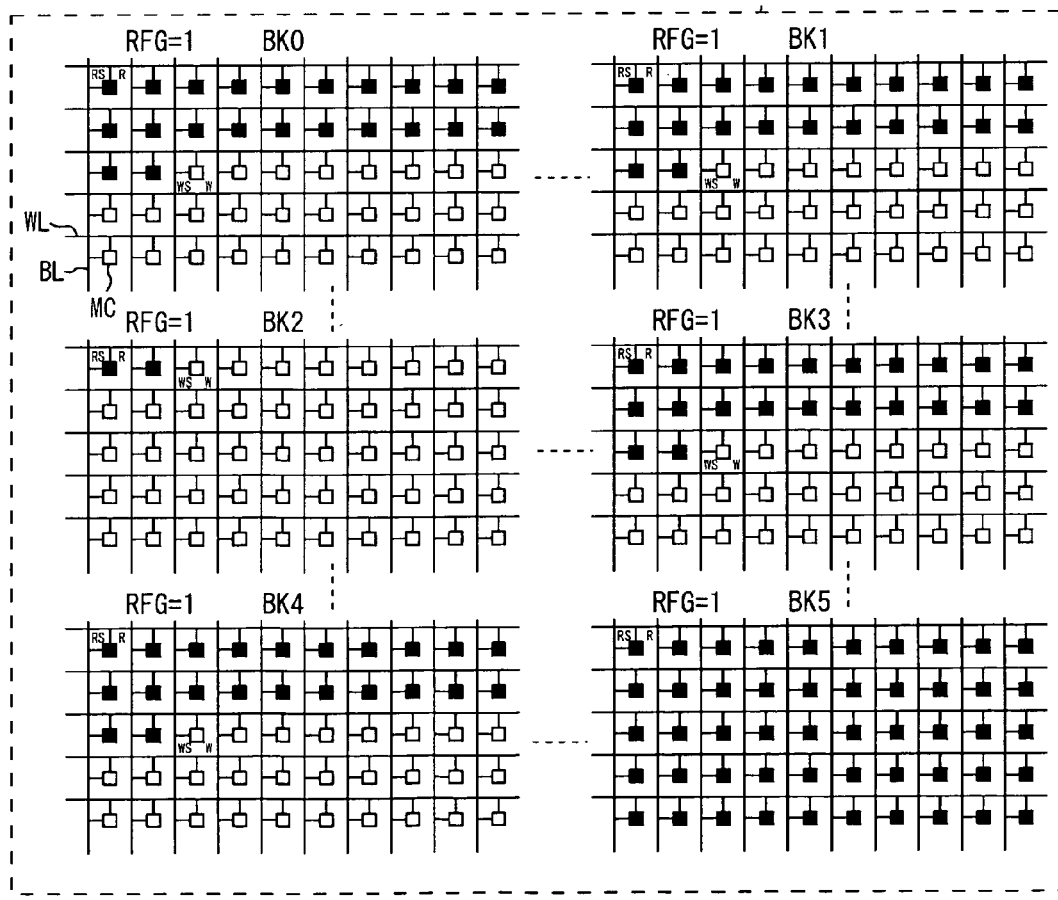
FIG. 24 is a schematic diagram for illustrating an example of the memory portion in which items of pixel data are stored in each of the memory banks when starting the storage and read and write addresses are set.

Addresses R, W of the memory banks, BK0 to BK5, are set to their starting addresses RS, WS received from the data storage control portion 120, as described above, when starting data access operation. All the read flags RFG of the six memory banks, BK0 to BK5, are set as their flag-on state, for example, 1. FIG. 24 illustrates data storage states, and address positions of read addresses R and write addresses W in the memory banks, BK0 to BK5, when starting the storage.

When starting any counts in the counter 141 and the set position of the access pattern ACP is set as its start position, items of pixel data Do0 to Do5 relative to six access pixels, IM1U, IM1, IM1D, IM2U, IM2, and IM2D, specified by the access pattern ACP of the start position are read out of address positions, which are indicated by the read addresses R, of the six memory banks, BK0 to BK5, at the same time. Then, the read addresses R for the six memory banks, BK0 to BK5, are respectively incremented.

Figure 25:
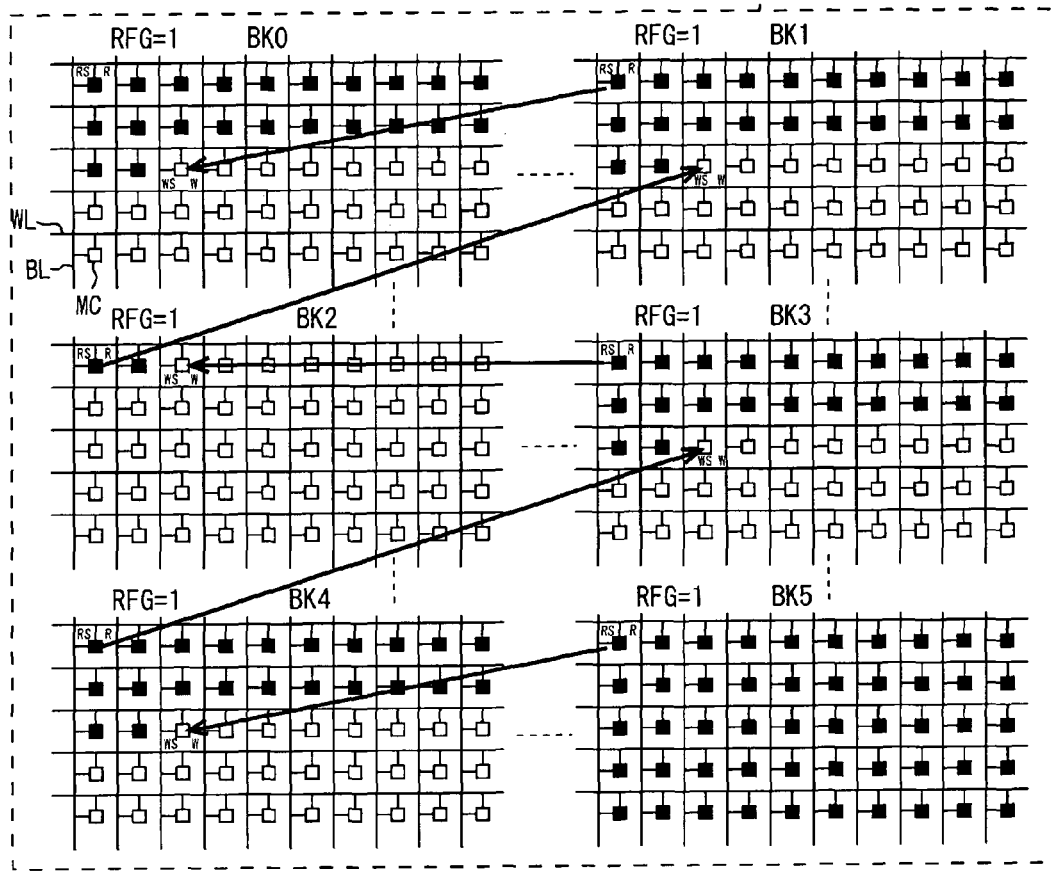
FIG. 25 is a schematic diagram for illustrating an example of the memory portion in which items of the pixel data are moved between the memory banks after reading them.

Items of pixel data read out of the memory banks, BK1 to BK5, are respectively written into address positions, which are indicated by the write address W, of the memory banks, BK0 to BK4 just before the read memory banks, BK1 to BK5, as shown in FIG. 25 (moving of the pixel data). Then, the write addresses W for the five memory banks, BK0 to BK4, are respectively incremented.

For every time when the set position of the access pattern ACP moves toward pixel row direction (horizontal direction of the screen) one-by-one pixel accompanying the reception of moving clock MCK, items of pixel data Do0 to Do5 relative to six access pixels, IM1U, IM1, IM1D, IM2U, IM2, and IM2D, specified by the access pattern ACP are then read out at the same time, as described above. The read address R is then incremented and pixel data is moved, and the write address W is then incremented.

Figure 26:
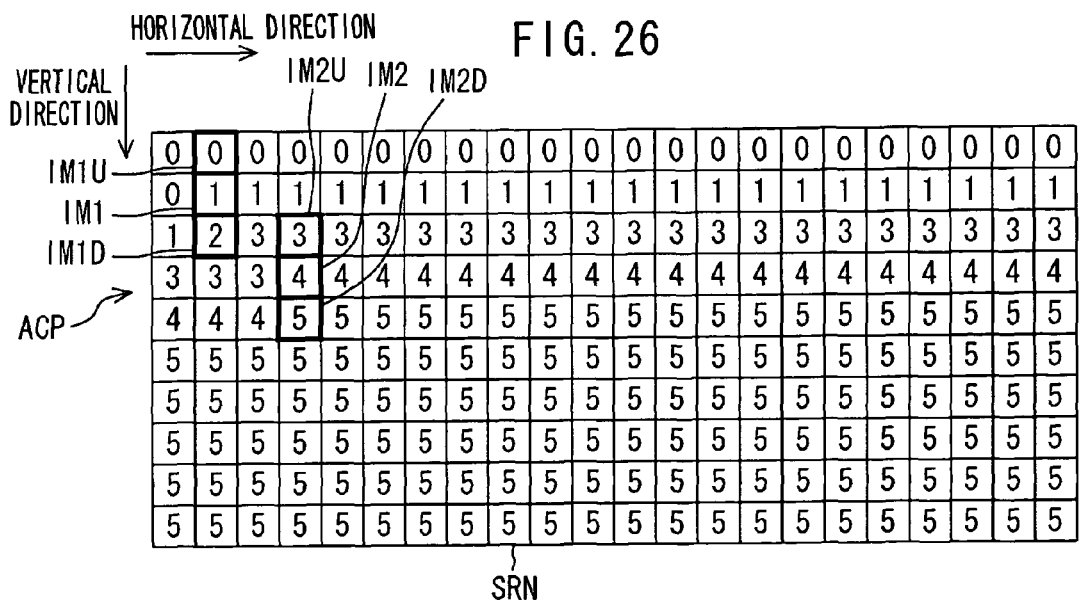
FIG. 26 is a diagram for illustrating an example of a screen in which items of pixel data thereof are stored in six memory banks when the access pattern set on the screen moves by one pixel from its start position.
Figure 27:
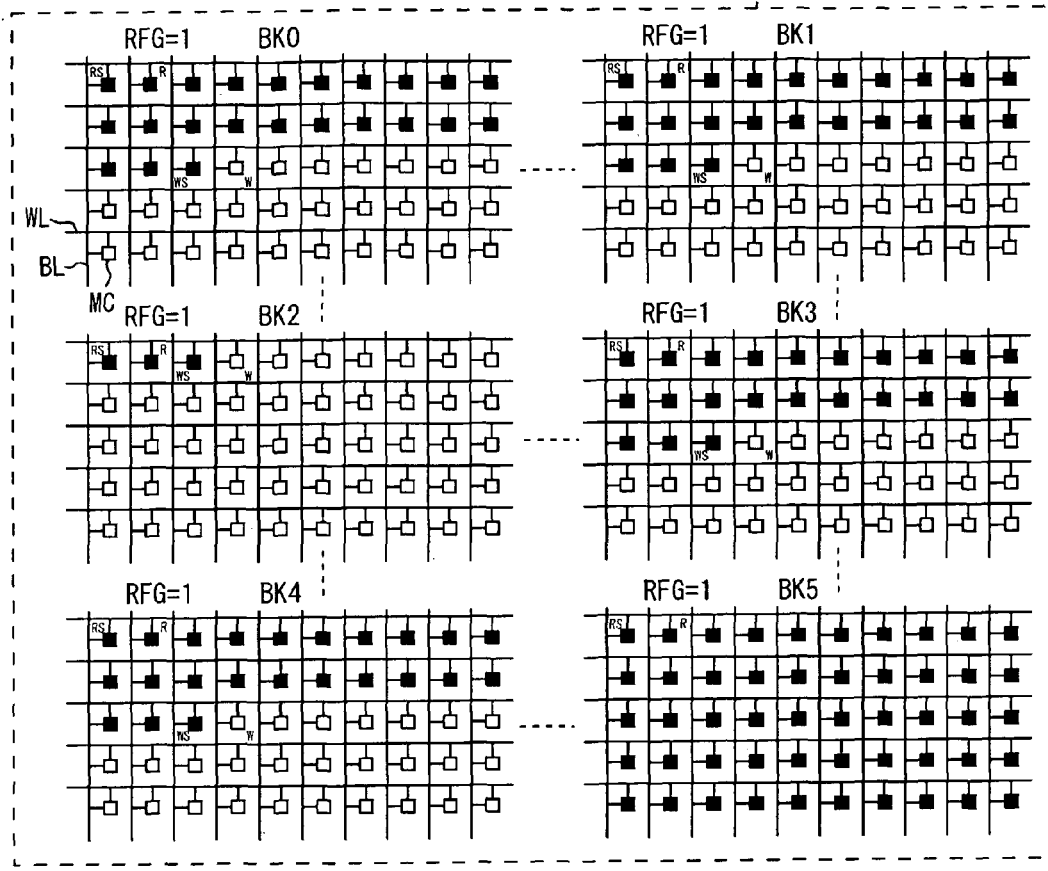
FIG. 27 is a schematic diagram for illustrating an example of the memory portion in which items of pixel data are stored in each of the memory banks when the access pattern moves by one pixel and read and write addresses are set.

FIG. 26 illustrates items of pixel data relative to pixels in the screen when the access pattern moves by one pixel from its start position. FIG. 27 illustrates data storage states and address positions of the read addresses R and the write addresses W in the memory banks, BK0 to BK5, when the access pattern ACP moves by one pixel.

Figure 28:
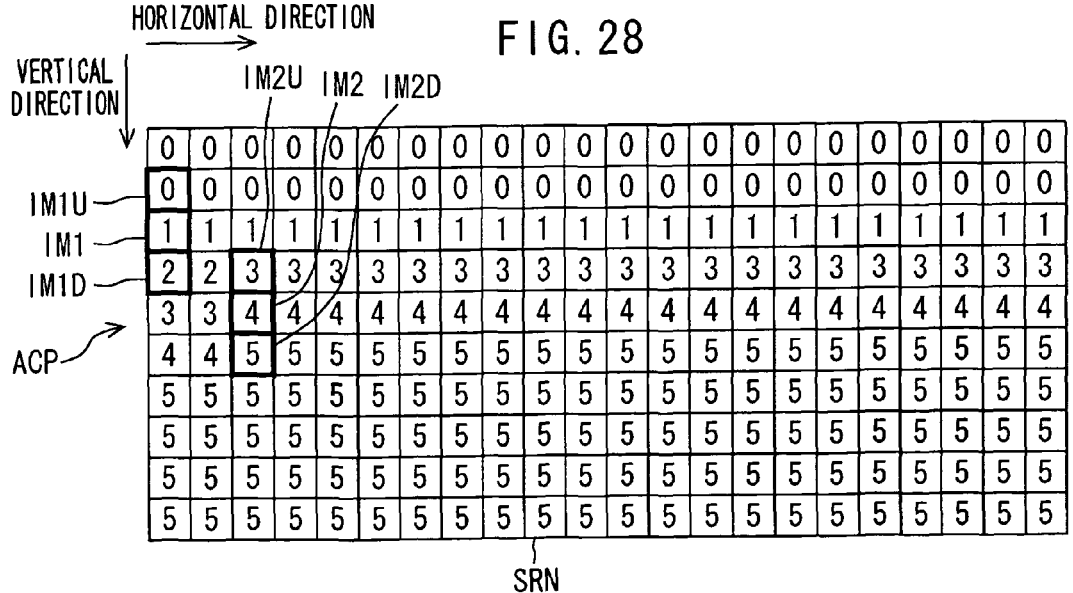
FIG. 28 is a diagram for illustrating an example of a screen in which items of pixel data thereof are stored in six memory banks when the access pattern set on the screen moves by 22 pixels from its start position.
Figure 29:
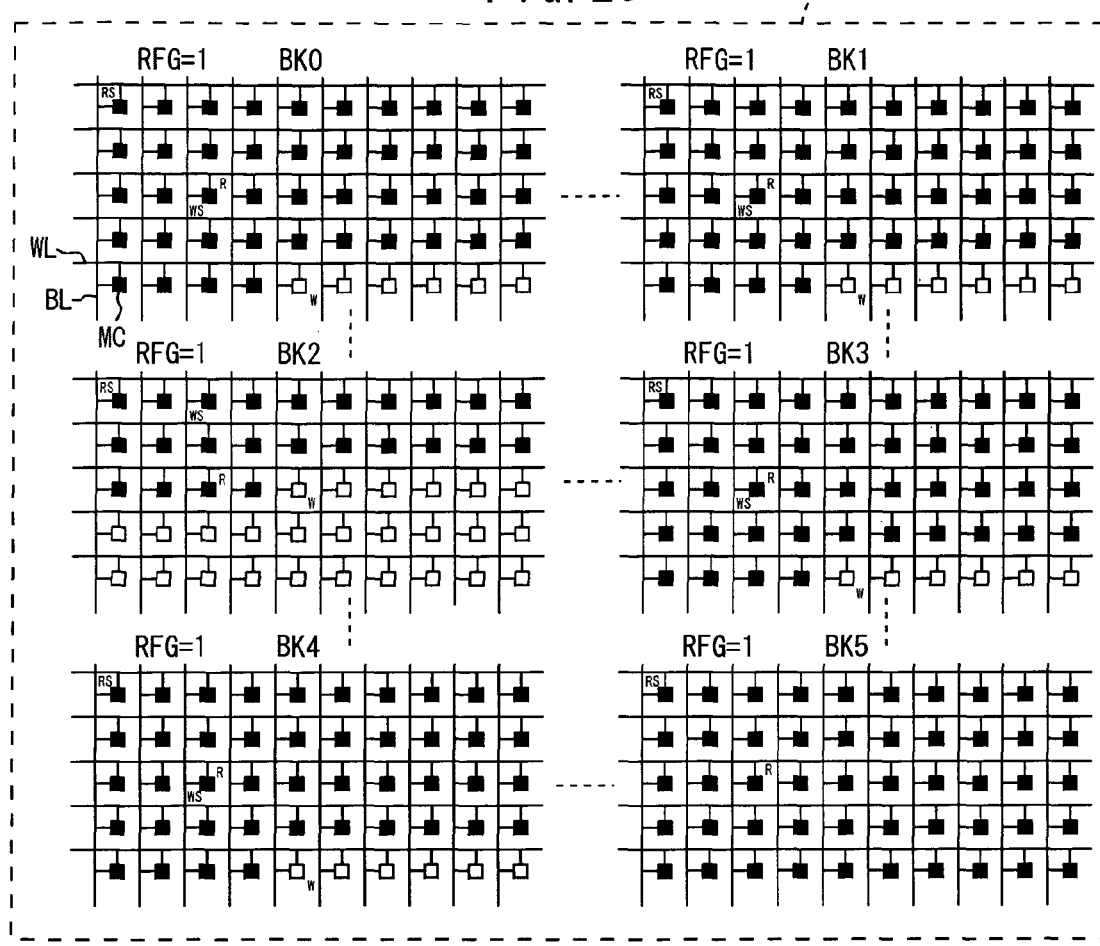
FIG. 29 is a schematic diagram for illustrating an example of the memory portion in which items of pixel data are stored in each of the memory banks when the access pattern moves by 22 pixels and read and write addresses are set.

FIG. 28 illustrates items of pixel data relative to pixels in the screen when the access pattern moves by 22 pixels from its start position. FIG. 29 illustrates data storage states and address positions of the read addresses R and the write addresses W in the memory banks, BK0 to BK5, when the access pattern ACP moves by 22 pixels.

In this case, as shown in FIG. 28, the set position of the access pattern ACP moves to a top of a column that is shifted by one pixel from its start position along a direction perpendicular to the pixel row direction. For every time when the access pattern ACP moves by 22 pixels from its start position, the set position of the access pattern ACP moves to a top of a column that is shifted by one pixel from its start position along a direction perpendicular to the pixel row direction. When the set position of the access pattern ACP moves to its final position, the data access apparatus 100 finishes any data access operations thereof.

The above data access operations with reference to FIGS. 23 to 29 have been described relative to the access pattern ACP shown in FIG. 10. The similar data access operations perform relative to the access patterns ACP shown in FIGS. 11 and 12, detailed description of which will be omitted.

When the access pattern ACP is set as shown in FIG. 10, items of pixel data Do0 to Do5 relative to six access pixels, IM1U, IM1, IM1D, IM2U, IM2, and IM2D, specified by the access pattern ACP of each set position in which the set position of the access pattern ACP moves from its start position toward pixel row direction are read out of the six memory banks, BK0 to BK5, at the same time. When the access pattern ACP is set as shown in FIG. 12, items of pixel data Do0 to Do3 relative to four access pixels, IM1U, IM1, IM2, and IM2D, specified by the access pattern ACP of each set position in which the set position of the access pattern ACP moves from its start position toward pixel row direction are read out of the four memory banks, BK0 to BK3, at the same time.

Figure 30:
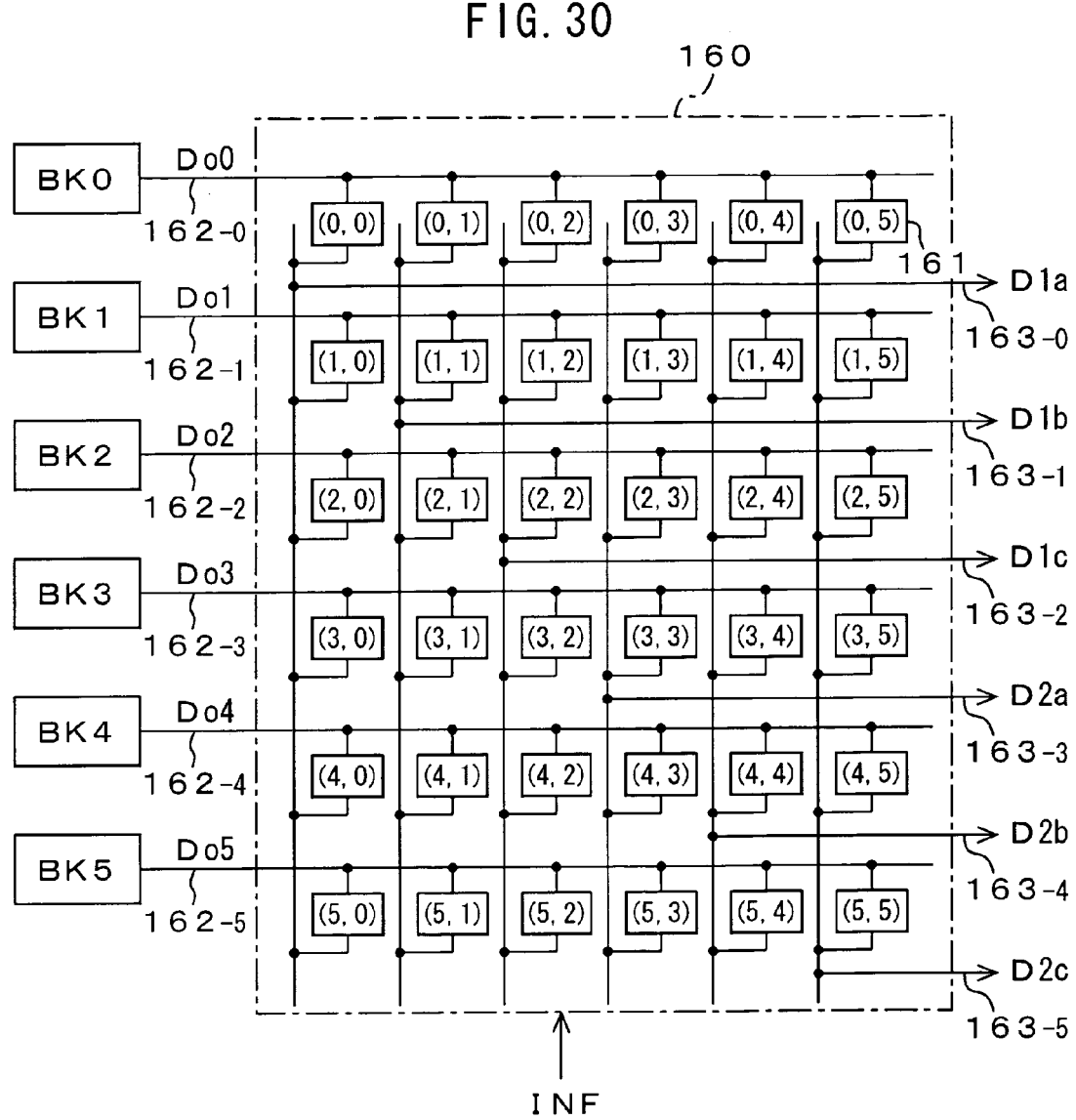
FIG. 30 is a block diagram for showing a configuration of a selector portion constituting the embodiment of the data access apparatus according to the invention.

The following will describe the selector portion 160. FIG. 30 shows a configuration of the selector portion 160. The selector portion 160 is composed of 6-by-6 matrix of 36 switch elements, 161(0, 0) to 161 (5, 5).

Input side of a first line of the matrix including six switch elements, 161(0, 0) to 161 (0, 5), is connected to an input line 162-0 for inputting pixel data Do0 output from the memory bank BK0. Input side of a second line of the matrix including six switch elements, 161(1, 0) to 161 (1, 5), is connected to an input line 162-1 for inputting pixel data Do1 output from the memory bank BK1. Input side of a third line of the matrix including six switch elements, 161(2, 0) to 161 (2, 5), is connected to an input line 162-2 for inputting pixel data Do2 output from the memory bank BK2. Input side of a fourth line of the matrix including six switch elements, 161(3, 0) to 161 (3, 5), is connected to an input line 162-3 for inputting pixel data Do3 output from the memory bank BK3. Input side of a fifth line of the matrix including six switch elements, 161(4, 0) to 161 (4, 5), is connected to an input line 162-4 for inputting pixel data Do4 output from the memory bank BK4. Input side of a sixth line of the matrix including six switch elements, 161(5, 0) to 161 (5, 5), is connected to an input line 162-5 for inputting pixel data Do5 output from the memory bank BK5.

Output side of a first column of the matrix including six switch elements, 161(0, 0) to 161 (5, 0), is connected to an output line 163-0 for outputting pixel data D1a. Output side of a second column of the matrix including six switch elements, 161(0, 1) to 161 (5, 1), is connected to an output line 163-1 for outputting pixel data D1b. Output side of a third column of the matrix including six switch elements, 161(0, 2) to 161 (5, 2), is connected to an output line 163-2 for outputting pixel data D1c. Output side of a fourth column of the matrix including six switch elements, 161(0, 3) to 161 (5, 3), is connected to an output line 163-3 for outputting pixel data D2a. Output side of a fifth column of the matrix including six switch elements, 161(0, 4) to 161 (5, 4), is connected to an output line 163-4 for outputting pixel data D2b. Output side of a sixth column of the matrix including six switch elements, 161(0, 5) to 161 (5, 5), is connected to an output line 163-5 for outputting pixel data D2c.

The selector portion 160 receives the correspondence information INF on input and output from the selector-portion-setting portion 170, as described above. The correspondence information INF for input and output is information for indicating that the output lines 163-0 to 163-5 are respectively connected to any input lines 162-0 to 162-5. In this embodiment, the correspondence information INF on input and output is particularly information for identifying any switch elements to be connected among the switch elements, 161(0, 0) to 161 (5, 5).

For example, if the access pattern ACP is a pattern shown in FIG. 10, items of pixel data Do0 to Do5 relative to six access pixels, IM1U, IM1, IM1D, IM2U, IM2, and IM2D, are read out of the six memory banks, BK0 to BK5, at the same time. These items of pixel data Do0 to Do5 are respectively output through the input lines 162-0 to 162-5.

Figure 31:
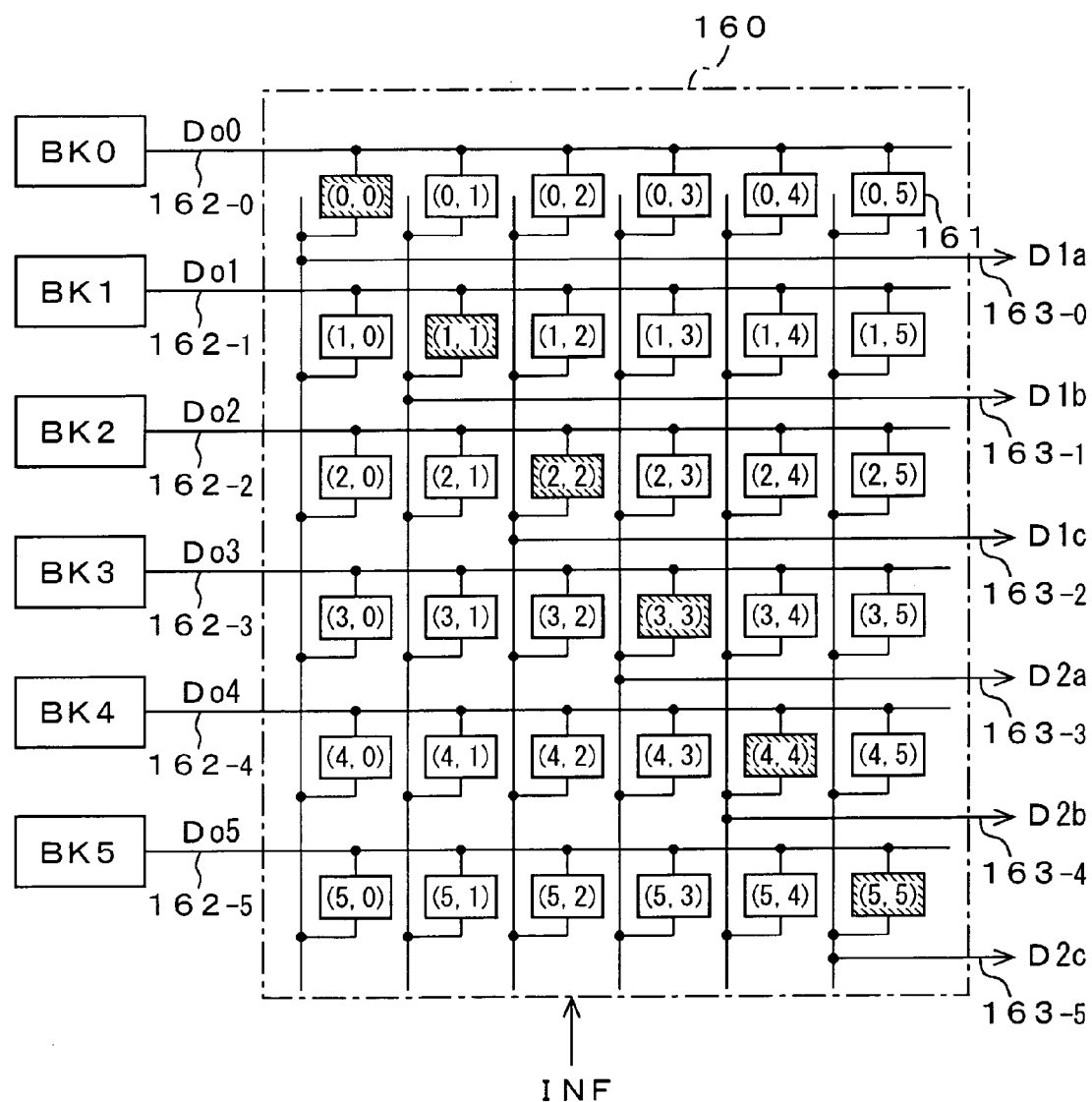
FIG. 31 is a diagram for illustrating selection operations of the selector portion for selecting the switch elements relative to the access pattern shown in FIG. 10.

In this case, the correspondence information INF on input and output is used for identifying the switch elements 161 (0, 0), 161 (1, 1), 161 (2, 2), 161 (3, 3), 161 (4, 4), and 161 (5, 5) as the switch elements to be connected. Thus, the switch elements 161 (0, 0), 161 (1, 1), 161 (2, 2), 161 (3, 3), 161 (4, 4), and 161 (5, 5), which are hatched in FIG. 31, become their connection states but other switch elements keep unconnected.

Figure 32:
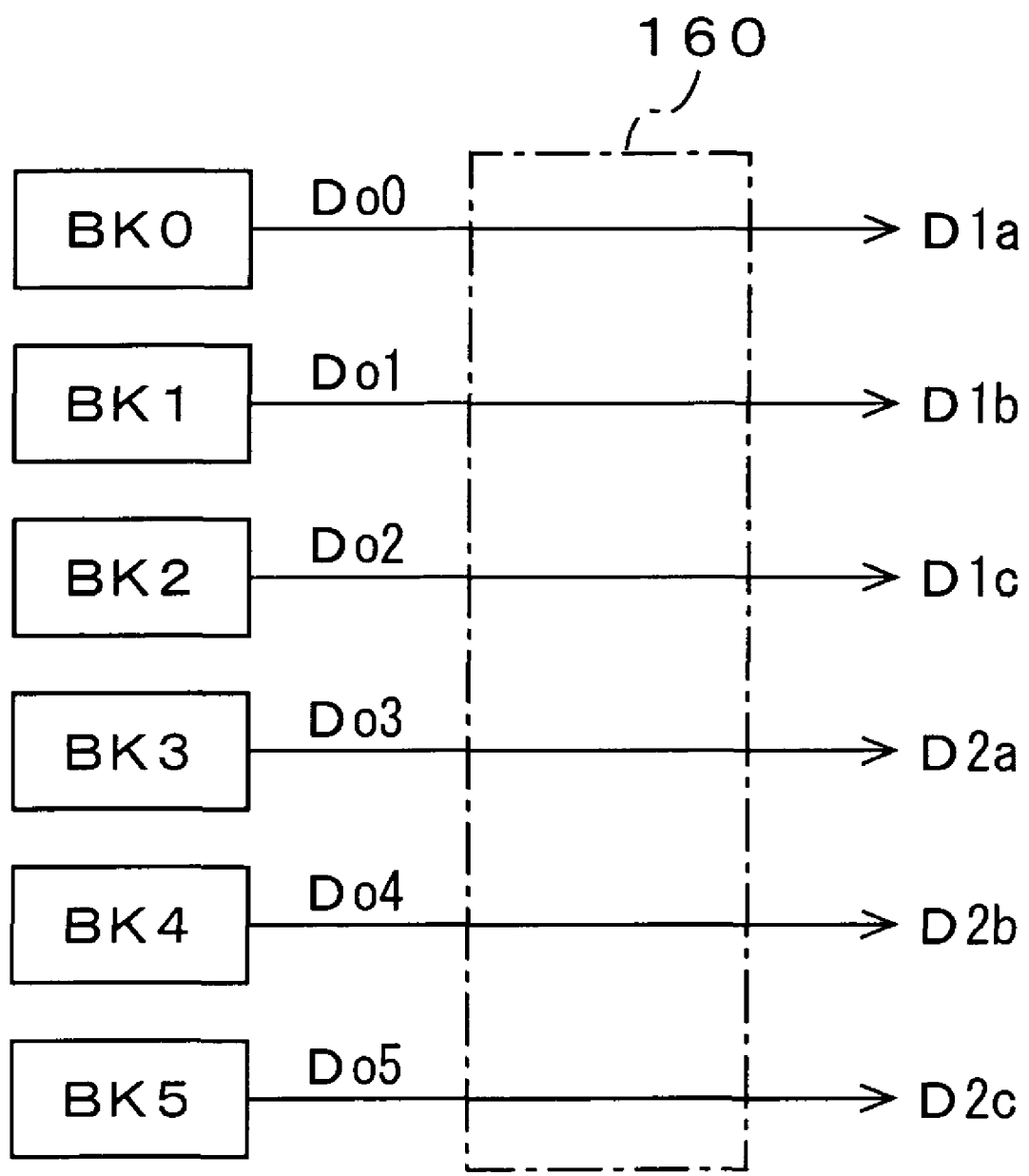
FIG. 32 is a diagram for illustrating an example of correspondence between respective memory banks and items of output data relative to the access pattern shown in FIG. 10.

This allows the input lines 162-0, 162-1, 162-2, 162-3, 162-4, and 162-5 to be respectively connected to the output lines 163-0, 163-1, 163-2, 163-3, 163-4, and 163-5. These items of pixel data Do0 to Do5 are output as six items of pixel data D1a, D1b, D1c, D2a, D2b, and D2c, respectively, as shown in FIG. 32. Thus, the six items of pixel data D1a, D1b, D1c, D2a, D2b, and D2c are output corresponding to each of the pixels constituting the groups of pixels G1, G2, which correspond to the target pixels IM1, IM2, thereby enabling any continuous pixel data in each of the groups of pixels G1, G2 to be obtained.

For example, if the access pattern ACP is a pattern shown in FIG. 11, items of pixel data Do0 to Do5 relative to six access pixels, IM1U, IM1, IM1D, IM2U, IM2, and IM2D, are read out of the six memory banks, BK0 to BK5, at the same time. These items of pixel data Do0 to Do5 are respectively output through the input lines 162-0 to 162-5.

Figure 33:
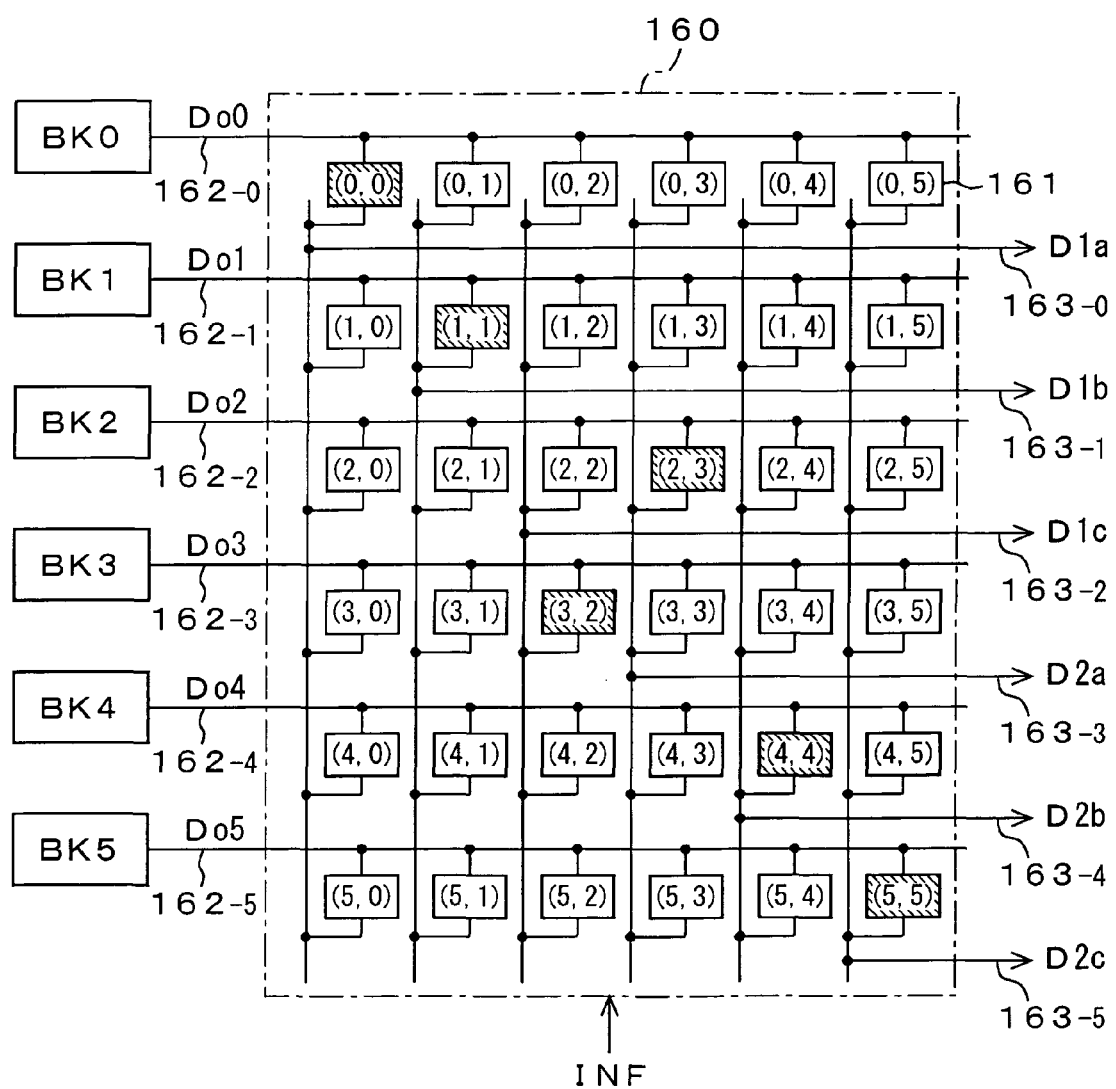
FIG. 33 is a diagram for illustrating selection operations of the selector portion for selecting the switch elements relative to the access pattern shown in FIG. 11.

In this case, the correspondence information INF for input and output is used for identifying the switch elements 161 (0, 0), 161 (1, 1), 161 (2, 3), 161 (3, 2), 161 (4, 4), and 161 (5, 5) as the switch elements to be connected. Thus, the switch elements 161 (0, 0), 161 (1, 1), 161 (2, 3), 161 (3, 2), 161 (4, 4), and 161 (5, 5), which are hatched in FIG. 33, become their connection states but other switch elements keep unconnected.

Figure 34:
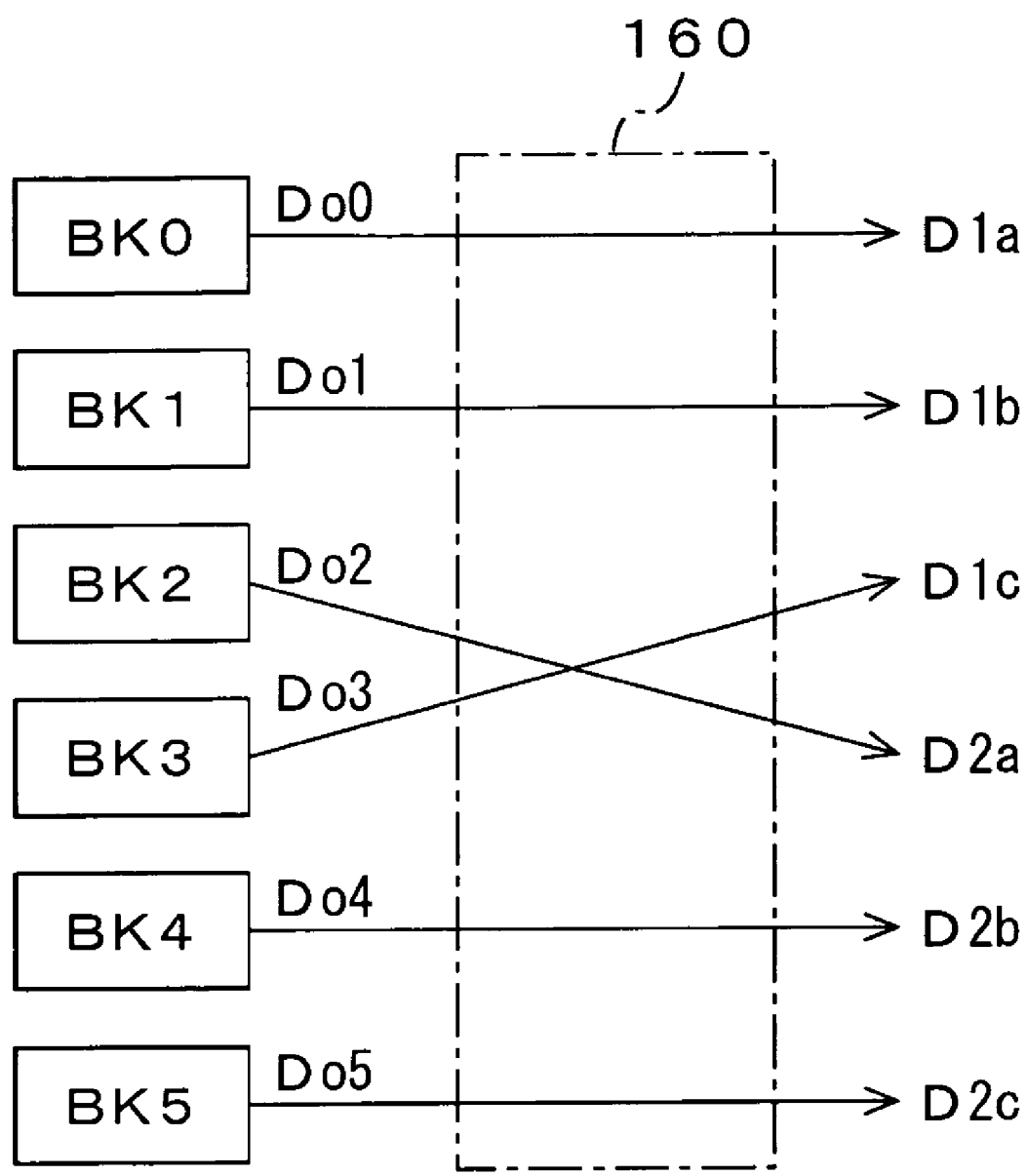
FIG. 34 is a diagram for illustrating an example of correspondence between respective memory banks and items of output data relative to the access pattern shown in FIG. 11.

This allows the input lines 162-0, 162-1, 162-2, 162-3, 162-4, and 162-5 to be respectively connected to the output lines 163-0, 163-1, 163-3, 163-2, 163-4, and 163-5. These items of pixel data Do0, Do1, Do3, Do2, Do4, and Do5 are output as six items of pixel data D1a, D1b, D1c, D2a, D2b, and D2c, respectively, as shown in FIG. 34. Thus, the six items of pixel data D1a, D1b, D1c, D2a, D2b, and D2c are output corresponding to each of the pixels constituting the groups of pixels G1, G2, which correspond to the target pixels IM1, IM2, thereby enabling any continuous pixel data in each of the groups of pixels G1, G2 to be obtained.

For example, if the access pattern ACP is a pattern shown in FIG. 12, items of pixel data Do0 to Do3 relative to four access pixels, IM1U, IM1, IM2, and IM2D, are read out of the four memory banks, BK0 to BK3, at the same time. These items of pixel data Do0 to Do3 are respectively output through the input lines 162-0 to 162-3.

Figure 35:
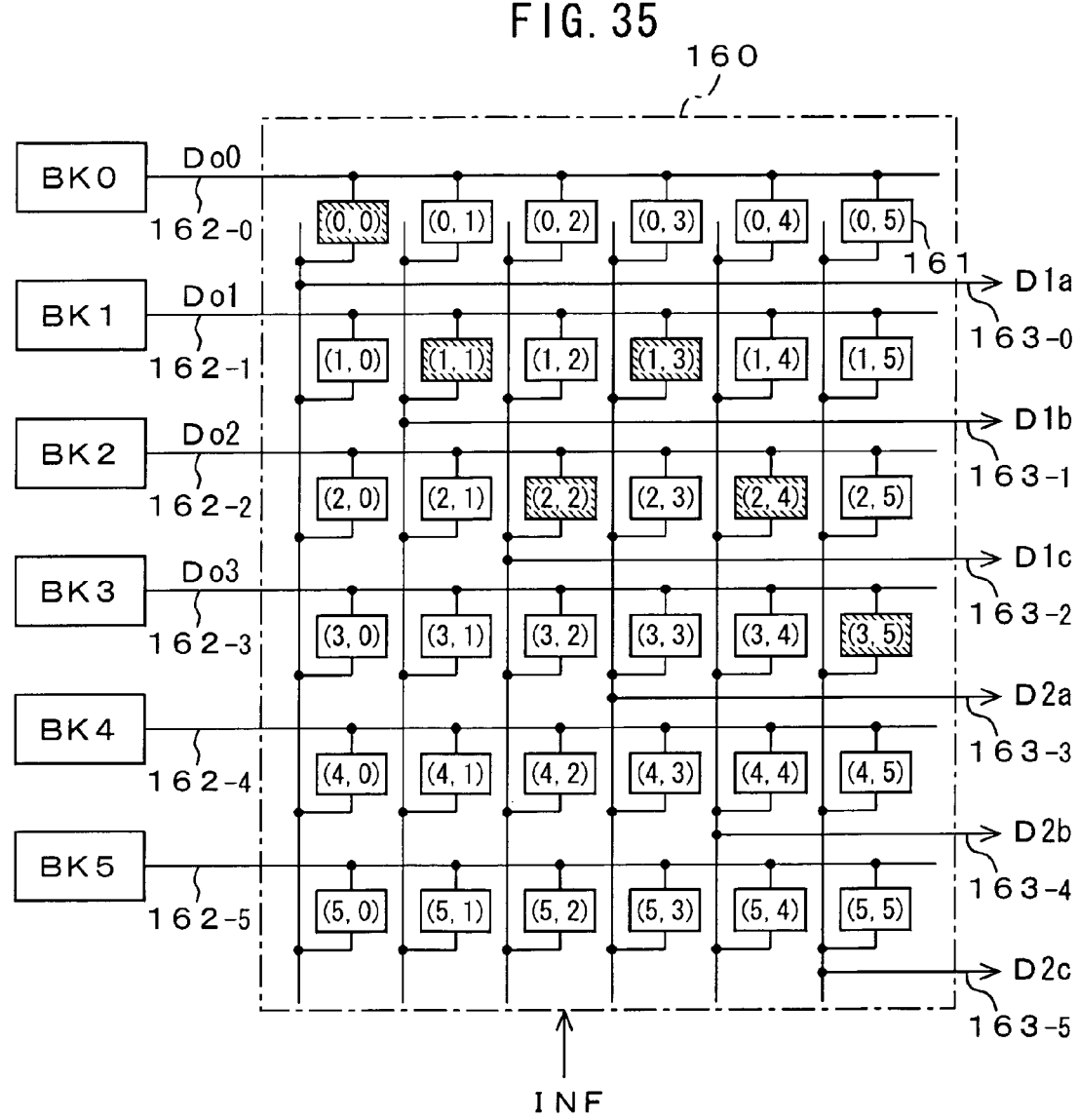
FIG. 35 is a diagram for illustrating selection operations of the selector portion for selecting the switch elements relative to the access pattern shown in FIG. 12.

In this case, the correspondence information INF for input and output is used for identifying the switch elements 161 (0, 0), 161 (1, 1), 161 (1, 3), 161 (2, 2), 161 (2, 4), and 161 (3, 5) as the switch elements to be connected. Thus, the switch elements 161 (0, 0), 161 (1, 1), 161 (1, 3), 161 (2, 2), 161 (2, 4), and 161 (3, 5), which are hatched in FIG. 35, become their connection states but other switch elements keep unconnected.

Figure 36:
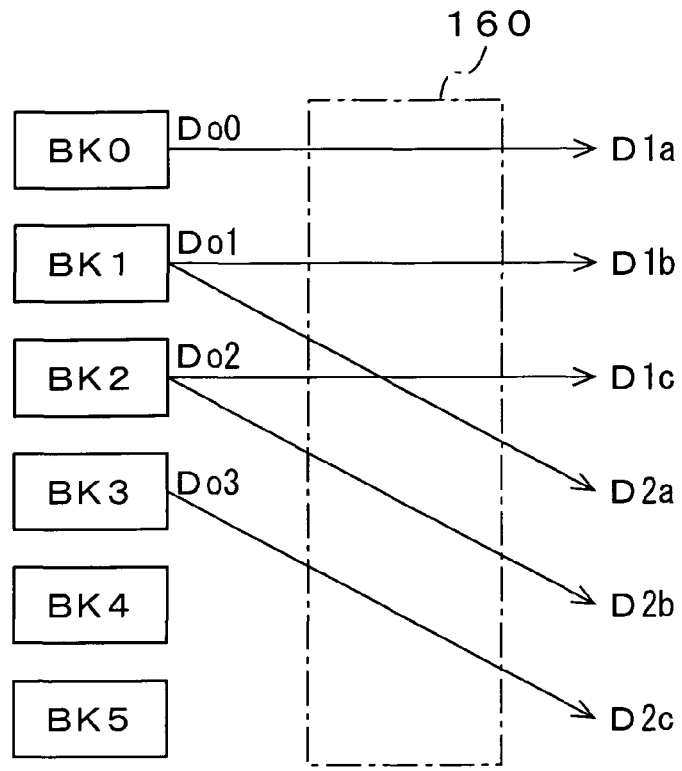
FIG. 36 is a diagram for illustrating an example of correspondence between respective memory banks and items of output data relative to the access pattern shown in FIG. 12.

This allows the input lines 162-0 to be connected to the output line 163-0; the input lines 162-1 to be connected to the output lines 163-1, 163-3; the input line 162-2 to be connected to the output lines 163-2, 163-4; and the input line 162-3 to be connected to the output line 163-5. These items of pixel data Do0, Do1, Do2, Do1, Do2, and Do3 are output as six items of pixel data D1a, D1b, D1c, D2a, D2b, and D2c, respectively, as shown in FIG. 36. Thus, the six items of pixel data D1a, D1b, D1c, D2a, D2b, and D2c are output corresponding to each of the pixels constituting the groups of pixels G1, G2, which correspond to the target pixels IM1, IM2, thereby enabling any continuous pixel data in each of the groups of pixels G1, G2 to be obtained.

Figure 37:
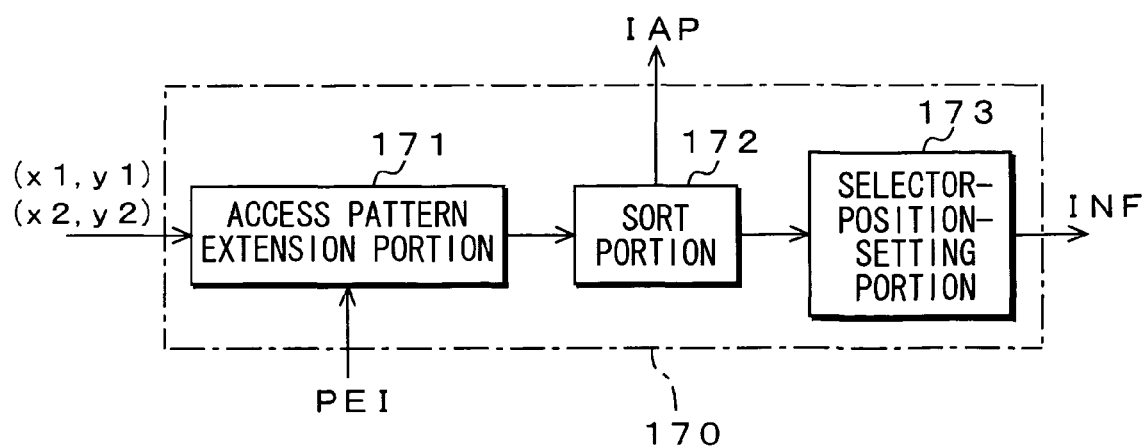
FIG. 37 is a block diagram for showing a configuration of a selector-portion-setting portion constituting the embodiment of the data access apparatus according to the invention.

The following will describe the selector-portion-setting portion 170. FIG. 37 shows a configuration of the selector-portion-setting portion 170. The selector-portion-setting portion 170 has an access pattern extension portion 171, a sort portion 172, and a selector-position-setting portion 173.

The access pattern extension portion 171 acquires coordinate information relative to respective pixels constituting each of the groups of pixels G1, G2 based on coordinate information (x1, y1), (x2, y2) on the plural center pixels IM1, IM2 constituting the access pattern ACP at the start position thereof and their peripheral information PEI. In this embodiment, as described above, the peripheral information PEI relates to upper and lower positions of each of the center pixels. The pieces of coordinate information on the three pixels constituting the group of pixels G1 are (x1, y1−1), (x1, y1), and (x1, y1+1). The pieces of coordinate information on the three pixels constituting the group of pixels G2 are (x2, y2−1), (x2, y2), and (x2, y2+1).

Figure 38:
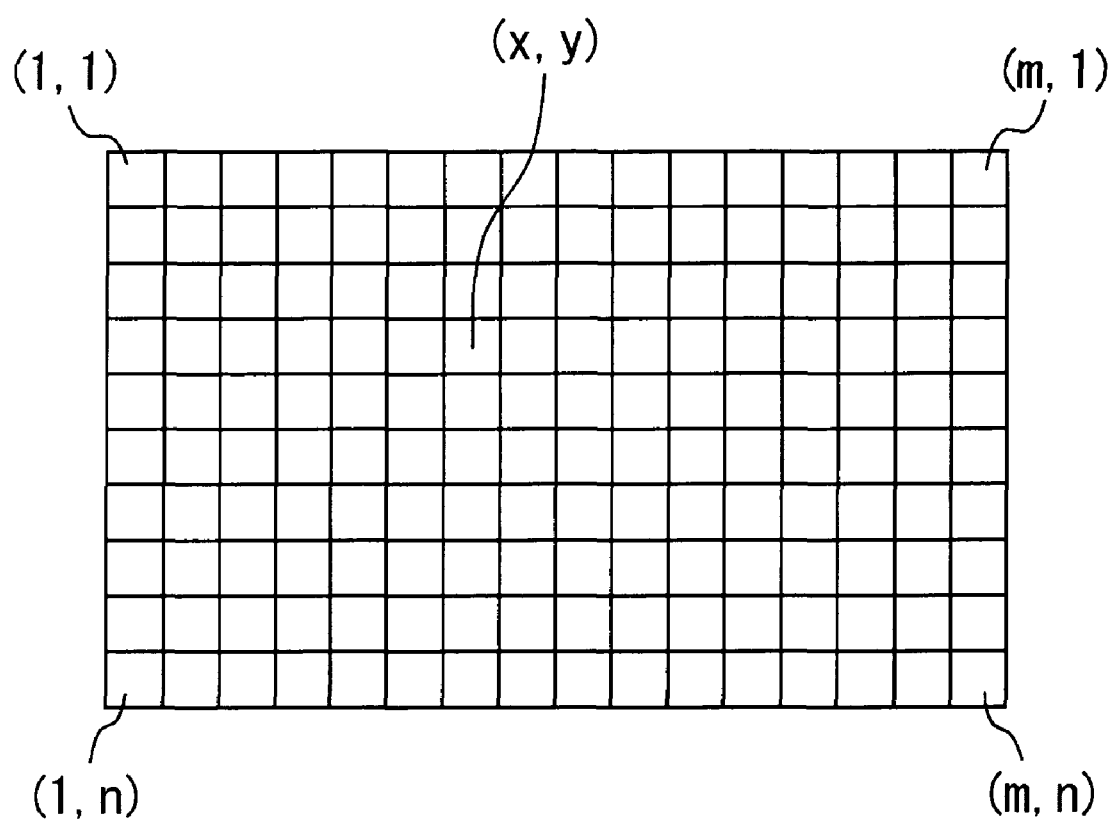
FIG. 38 is a diagram for showing numbers of pixels in a screen along its vertical and horizontal directions.

The sort portion 172 acquires order information indicating an order that respective pixels constituting each of the groups of pixels G1, G2 are set as the target pixel at an early storage stage thereof based on the coordinate information, which is acquired by the access pattern extension portion 171, on the respective pixels constituting each of the group of pixels G1, G2. If the screen SRN is composed of m by n pixels (m pixels in a horizontal direction thereof by n pixels in a vertical direction) as shown in FIG. 38, the order information NO on a pixel having coordinate information (x, y) can be generally obtained using a following formula:

$$NO=x+(y-1)m$$

Further, the sort portion 172 supplies as the information IAP on the access pattern ACP the order information thus obtained relative to the respective pixels constituting each of the groups of pixels G1, G2 to the data storage control portion 120. In this case, since the pixels constituting the groups of pixels G1, G2 may be overlapped with each other according to any positional relationship of the center pixels IM1, IM2 as described above, parts of the order information on the respective pixels constituting each of the groups of pixels G1, G2 are the same, thereby causing a result that numbers of pixels constituting the access pattern ACP may decrease below six (see FIG. 12).

The selector-position-setting portion 173 generates the corresponding information INF on input and output based on the order information, which has been acquired by the sort portion 172, on the respective pixels constituting each of the groups of pixels G1, G2 and supplies it to the selector portion 160. The corresponding information INF on input and output is information for identifying a switch element to be connected among the switch elements, 161 (0, 0) to 161 (5, 5), in the above selector portion 160. Thus, it can be determined whether an order that respective pixels constituting each of the groups of pixels G1, G2 are set as the target pixel is successive in each of the groups of pixels by the order information on the respective pixels constituting each of the groups of pixels G1, G2. By the order information, it can be determined whether numbers of pixels constituting the access pattern ACP may decrease below six because the pixels constituting the groups of pixels G1, G2 may be overlapped with each other.

This allows the selector-position-setting portion 173 to determine that any input lines 162-0 to 162-5 can be connected to the respective output lines 163-0 to 163-5 in the selector portion 160 in order to output six items of the pixel data D1a, D1b, D1c, D2a, D2b, and D2c corresponding to the respective pixels constituting the groups of pixels G1, G2, thereby enabling the corresponding information INF on input and output to be suitably generated.

According to the data access apparatus 100 shown in FIG. 9, at its early storage stage, the items of pixel data relative to N early access pixels specified by the access pattern ACP that is set to its start position are respectively stored to the separate memory banks; at data access stage, when the set position of the access pattern ACP is a predetermined position, items of pixel data relative to N access pixels specified the access pattern ACP at this predetermined position are read out of N memory banks BK0 to BK(N−1) at the same time; and at a stage that the set position of the access pattern ACP moves toward a pixel row direction, item of pixel data read out of a predetermined memory bank is stored in a memory bank just before the memory bank that stores the pixel data so that items of pixel data relative to N pixels specified the access pattern ACP at the set position can be stored in the separate memory banks, thereby easily enabling the N access pixels specified the access pattern ACP to be obtained at the same time at each set position where the set position of the access pattern ACP moves from its start position along the pixel row direction.

According to the data access apparatus 100 shown in FIG. 9, the selector portion 160 selectively transmits six items of pixel data D1a to D1c and D2a to D2c among items of pixel data Do0 to Do(N−1) relative to N access pixels, which are acquired from N memory banks BK0 to BK(N−1) at the same time, based on the corresponding information INF on input and output, corresponding to the respective pixels constituting each of the groups of pixels G1, G2. This allows the data access apparatus 100 to acquire pixel data that is successive in each of the groups of pixels G1, G2 irrespective of any positional relationship of the center pixels, IM1, IM2.

According to the data access apparatus 100 shown in FIG. 9, the selector-portion-setting portion 170 generates the information IAP on the access pattern ACP and the corresponding information INF on input and output based on the coordinate information (x1, y1), (x2, y2) on the center pixels IM1, IM2 and the peripheral information PEI thereof. A user can set the access pattern ACP optionally by giving only the coordinate information (x1, y1), (x2, y2) on the center pixels IM1, IM2 and the peripheral information PEI thereof.

According to the data access apparatus 100 shown in FIG. 9, the data storage control portion 120 gives the data access control portion 140 the read flag RFG of each of the memory banks BK to BK5. This may avoid any control devices for controlling the data storage control portion 120 and the data access control portion 140 generating the read flag RFG for the memory banks BK0 to BK5 based on the information on access pattern ACP and supplying it to the data access control portion 140.

According to the data access apparatus 100 shown in FIG. 9, the data storage control portion 120 gives the data access control portion 140 the start addresses RS, WS in each of the memory banks BK to BK5. This may avoid any control devices for controlling the data storage control portion 120 and the data access control portion 140 generating the start addresses RS, WS in the memory banks BK0 to BK5 based on the information on access pattern ACP and a fixed number N of pieces of the information and supplying it to the data access control portion 140.

Although it has been described in the above embodiments that the numbers of center pixels are two or the peripheral information PEI relates to the upper and lower relationships of the center pixel, this invention is not limited thereto. The invention can be applied to a case where the numbers of center pixels are more than two or the peripheral information PEI relates to any case other than these upper and lower relationships of the center pixel. It is to be noted that, in this case, if the numbers of center pixels are "p" pieces and the numbers of peripheral pixels of the center pixel are "q" pieces, it is necessary for the memory portion 110 to have p by q memory banks in order to be suitably applicable even when p pieces of center pixels have any positional relationship to each other.

Although it has been described in the above embodiments that the pixel rows each extending in a horizontal direction are arranged sequentially in a vertical direction so that the screen SRN can be configured as well as, at an early storage stage thereof, pixels of the pixel rows are sequentially set as a target pixel and items of pixel data relative to the target pixels are stored into N memory banks BK0 to BK(N−1) with them being divided thereto and, at a data access stage thereof, items of pixel data Do1 to Do(N−1) relative to N access pixels specified by the access pattern ACP are acquired at the same time at each set position where the set position of the access pattern ACP moves toward the pixel row direction, the pixel columns each extending in a vertical direction can be arranged sequentially in a horizontal direction so that the screen SRN can be configured and any suitable operations can be performed at the early storage stage and the data access stage thereof.

Although it has been described that the data storage control portion 120 gives the data access control portion 140 the start addresses RS, WS and the read flag RFG, this invention is not limited thereto. It is possible for any control device for controlling the data storage control portion 120 and the data access control portion 140 to give the data access control portion 140 these start addresses RS, WS and the read flag RFG.

The present invention could well be preferably applied to a data access apparatus or the like in which items of pixel data relative to plural pixels specified by the access pattern can be easily acquired at each set position where the set position of the access pattern moves sequentially from its start position toward the pixel row direction. The present invention could well be preferably applied to an apparatus in which a particular data array can be recognized and any pattern recognition, any motion detection and the like can be processed.

According to the above embodiments, it is possible to access plural items of pixel data at the same time with plural items of pixel data relative to plural pixels specified by the access pattern being stored the separate memory banks at each set position where the set position of the access pattern moves sequentially from its start position toward the pixel row direction, thereby allowing the plural items of pixel data to be easily acquired at the same time.

It should be understood by those skilled in the art that various modifications, combinations, sub-combinations and alternations may occur depending on design requirements and other factors insofar as they are within the scope of the appended claims or the equivalents thereof.

The invention claimed is:

1. A data access apparatus, comprising:
a memory portion including plural memory banks;
a data storage control portion that controls the memory portion to set as a target pixel a pixel in a pixel row in a predetermined screen sequentially in which pixel rows each extending in any one of vertical and horizontal directions are sequentially arranged in any one of the vertical and horizontal directions, and to store pixel data of the target pixel in the plural memory banks, the pixel data of the target pixel being divided into the plural memory banks based on information on an access pattern of plural pixels set on the predetermined screen, the plural pixels being plural center pixels and peripheral pixels positioned at the periphery of each of the center pixels;
a data access control portion that controls the memory portion to acquire items of pixel data for the plural pixels specified by the access pattern at the same time from the plural memory banks at each set position in which the set position of the access pattern moves from a start position thereof toward a pixel row direction; and
a selector portion that receives items of pixel data for the plural pixels specified by the access pattern, the items of pixel data being acquired from the plural memory banks at the same time, and transmits items of pixel data corresponding to respective pixels constituting groups of pixels based on correspondence information on input and output, each group of pixels including a center pixel and peripheral pixels positioned at a periphery of the center pixel, wherein
the data storage control portion starts storing the pixel data of the target pixel in a first memory bank when the target pixel first corresponds to any one of the plural pixels based on the plural pixels specified by the access pattern at a start position of the set position, and then switches the memory banks that store the pixel data of the target pixel sequentially when the target pixel corresponds to any one of the plural pixels; and
when the set position is a predetermined position, the data access control portion reads items of the pixel data for the plural pixels specified by the access pattern at the predetermined position respectively from the plural memory banks at the same time, and when the set position moves toward the pixel row direction, the data access control portion stores each item of the pixel data read from the memory banks for the set position from which the access pattern is moved to a write-starting address in a memory bank that is just before the memory bank that stores the pixel data to store respective items of the pixel data for the plural pixels specified by the access pattern at each of the set positions in the corresponding separate memory banks, wherein the write-starting address in the memory bank is an address next to an address in which last pixel data is stored.

2. The data access apparatus according to claim 1, wherein the data storage control portion includes:
a correspondence determination portion that determines whether the target pixel is a pixel corresponding to any one of the plural pixels specified by the access pattern set at the start position of the set position; and
an address-generating portion that generates a write address to the memory portion for each target pixel based on the determination output from the correspondence determination portion.

3. The data access apparatus according to claim 2, wherein the data storage control portion further includes a start-address-generating portion that generates a read-starting address and a write-starting address for each of the memory banks; and
for each of the memory banks, the start-address-generating portion sets an address in which first pixel data is stored as the read-starting address and an address next to an address in which last pixel data is stored as the write-starting address.

4. The data access apparatus according to claim 2, wherein the data storage control portion further includes a read-flag-generating portion that generates a read flag indicating whether a read operation corresponding to respective plural memory banks is performed; and
the read-flag-generating portion sets the read flag for the memory bank in which the pixel data corresponding to any one of the plural pixels is stored to a flag-on state indicating that read-out is available, and the read flag for other memory banks to a flag-off state indicating that read-out is unavailable.

5. The data access apparatus according to claim 1, wherein the data access control portion includes:
a read-address-generating portion that generates read addresses for the plural memory banks; and
a write-address-generating portion that generates write addresses for the plural memory banks, wherein for each of the memory banks, the read-address-generating portion sets a first read address as a read-starting address obtained from outside and increments the read address to generate a next read address when reading the pixel data at each set position; and for each of the memory banks, the write-address-generating portion sets a first write address as a write-starting address obtained from outside and increments the write address to generate a next write address when writing the pixel data at each set position.

6. The data access apparatus according to claim 5, wherein the write-starting address and the read-starting address obtained from outside are obtained from the data storage control portion.

7. The data access apparatus according to claim 5, wherein the data access control portion further includes a read-flag-generating portion that generates a read flag indicating whether a read operation from the respective plural memory banks is performed; and the read-flag-generating portion sets the read flag for the memory bank in which the pixel data for any one of the plural pixels specified by the access pattern set at the start position of the set position is stored to a flag-on state indicating that read-out is available, and the read flag for other memory banks to a flag-off state indicating that read-out is unavailable.

8. The data access apparatus according to claim 7, wherein the read flag obtained from outside is obtained from the data storage control portion.

9. The data access apparatus according to claim 1, further comprising a selector-portion-setting portion that generates the information on the access pattern and the correspondence information on input and output, the selector-portion-setting portion including:

an access pattern extension portion that acquires coordinate information for respective pixels constituting each of the groups of pixels based on coordinate information on the plural center pixels and information on the peripheral pixels positioned at the periphery of each of the center pixels;

a sort portion that acquires order information indicating an order in which respective pixels constituting each of the groups of pixels are set as the target pixel based on the acquired coordinate information and generates the information on the access pattern representing the acquired coordinate information as the order information; and a selector-position-setting portion that generates the correspondence information on input and output based on the acquired order information on the respective pixels constituting each of the groups of pixels.

10. A data access method, comprising:

setting as a target pixel a pixel in a pixel row in a predetermined screen sequentially in which pixel rows each extending in any one of vertical and horizontal directions are sequentially arranged in any one of vertical and horizontal directions, and storing pixel data of the target pixel in plural memory banks, the pixel data of the target pixel being divided into the plural memory banks based on information on an access pattern of plural pixels set on the predetermined screen, the plural pixels being plural center pixels and peripheral pixels positioned at the periphery of each of the center pixels;

acquiring items of the pixel data for the plural pixels specified by the access pattern at the same time from the plural memory banks at each set position in which the set position of the access pattern moves from a start position thereof toward a pixel row direction; and receiving items of the pixel data for plural pixels specified by the access pattern, the items of the pixel data being acquired from the plural memory banks at the same time, and transmitting items of the pixel data corresponding to respective pixels constituting groups of pixels based on correspondence information on input and output, each group of pixels including a center pixel and peripheral pixels positioned at a periphery of the center pixel, wherein in the step of storing the pixel data of the target pixel, storage of the pixel data of the target pixel in a first memory bank starts when the target pixel first corresponds to any one of the plural pixels based on the plural pixels specified by the access pattern at a start position of the set position, and the memory banks that store the pixel data of the target pixel are switched sequentially when the target pixel corresponds to any one of the plural pixels; and in the step of acquiring items of the pixel data, when the set position is a predetermined position, items of the pixel data for the plural pixels specified by the access pattern at the predetermined position are read respectively from the plural memory banks at the same time, and when the set position moves toward the pixel row direction, each item of the pixel data read from the memory banks for the set position from which the access pattern is moved is stored to a write-starting address in a memory bank that is just before the memory bank that stores the pixel data to store respective items of the pixel data for the plural pixels specified by the access pattern at each of the set positions in the corresponding separate memory banks, wherein the write-starting address in the memory bank is an address next to an address in which last pixel data is stored.

11. A non-transitory computer readable recording medium recorded with a program allowing a computer to carry out a data access method, the method comprising:

setting as a target pixel a pixel in a pixel row in a predetermined screen sequentially in which pixel rows each extending in any one of vertical and horizontal directions are sequentially arranged in any one of vertical and horizontal directions, and storing pixel data of the target pixel in plural memory banks, the pixel data of the target pixel being divided into the plural memory banks based on information on an access pattern of plural pixels set on the predetermined screen, the plural pixels being plural center pixels and peripheral pixels positioned at the periphery of each of the center pixels;

acquiring items of the pixel data for the plural pixels specified by the access pattern at the same time from the plural memory banks at each set position in which the set position of the access pattern moves from a start position thereof toward a pixel row direction; and receiving items of the pixel data for the plural pixels specified by the access pattern, the items of the pixel data being acquired from the plural memory banks at the same time, and transmitting items of the pixel data corresponding to respective pixels constituting groups of pixels based on correspondence information on input and output, each group of pixels including a center pixel and peripheral pixels positioned at a periphery of the center pixel, wherein in the step of storing the pixel data of the target pixel, storage of the pixel data of the target pixel in a first memory bank starts when the target pixel first corresponds to any one of the plural pixels based on the plural pixels specified by the access pattern at a start position of the set position, and the memory banks that store the pixel data of the target pixel are switched sequentially when the target pixel corresponds to any one of the plural pixels; and in the step of acquiring items of the pixel data, when the set position is a predetermined position, items of the pixel data for the plural pixels specified by the access pattern at the predetermined position are read respectively from the plural memory banks at the same time, and when the set position moves toward the pixel row direction, each item of the pixel data read from the memory banks for the set position from which the access pattern is moved is stored to a write-starting address in a memory bank that is just before the memory bank that stores the pixel data to store respective items of the pixel data for the plural pixels specified by the access pattern at each of the set positions in the corresponding separate memory banks, wherein the write-starting address in the memory bank is an address next to an address in which last pixel data is stored.

* * * * *